Aug. 29, 1967 G. A. KINNEY 3,338,992
PROCESS FOR FORMING NON-WOVEN FILAMENTARY STRUCTURES FROM
FIBER-FORMING SYNTHETIC ORGANIC POLYMERS
Filed Dec. 21, 1965 8 Sheets-Sheet 1

INVENTOR
GEORGE ALLISON KINNEY
BY
ATTORNEY

INVENTOR
GEORGE ALLISON KINNEY
ATTORNEY

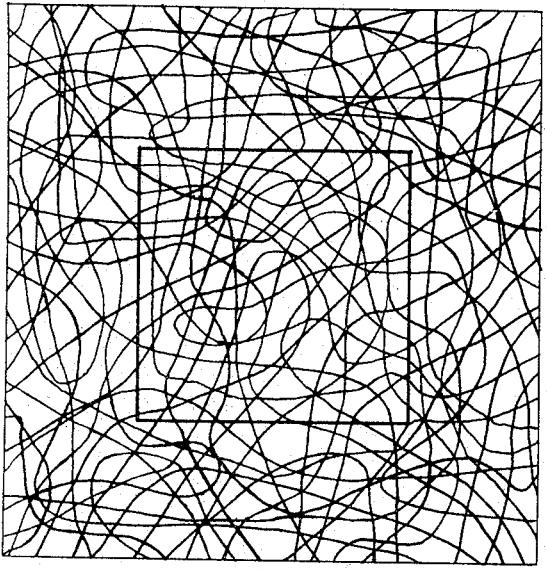
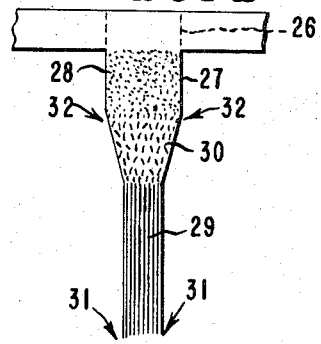
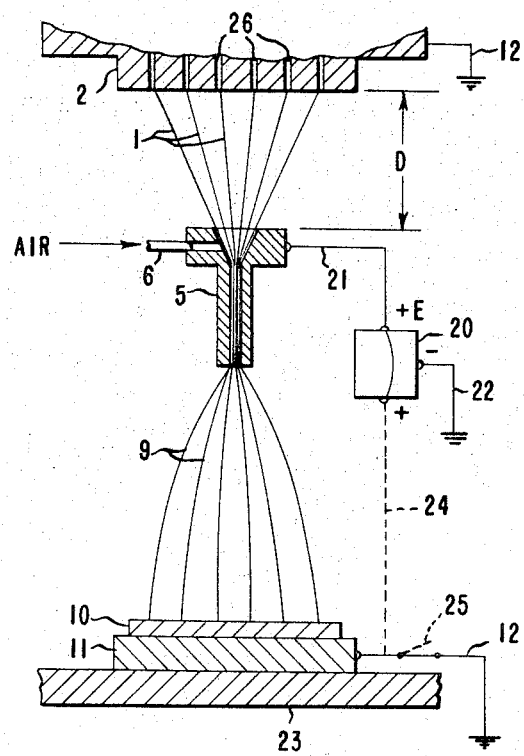
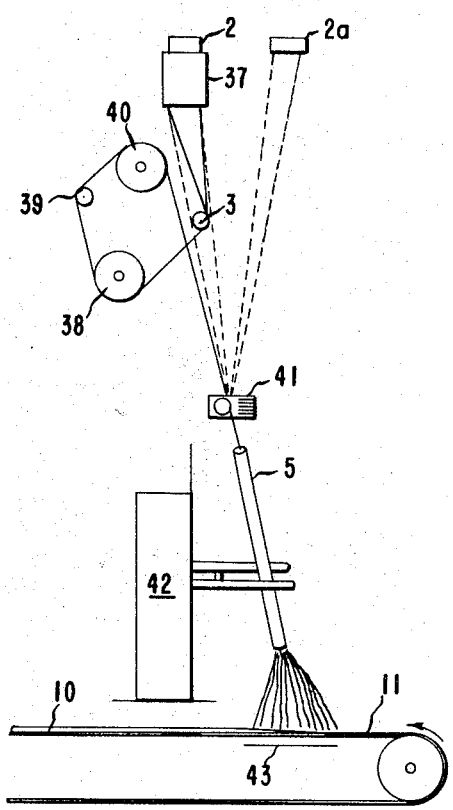

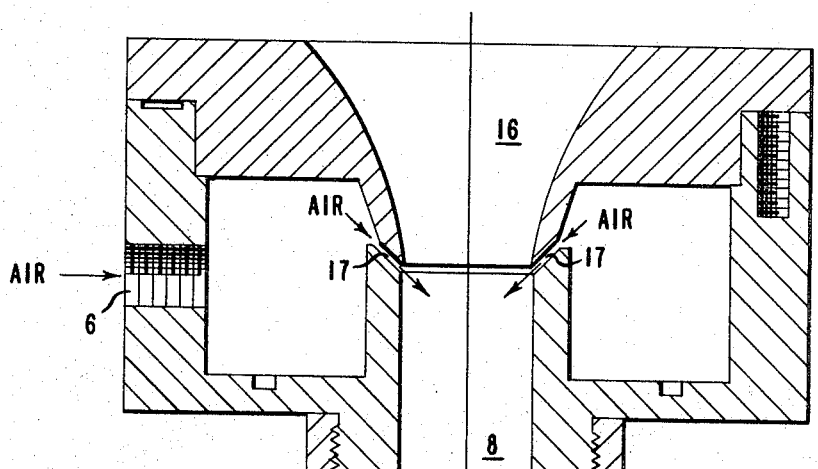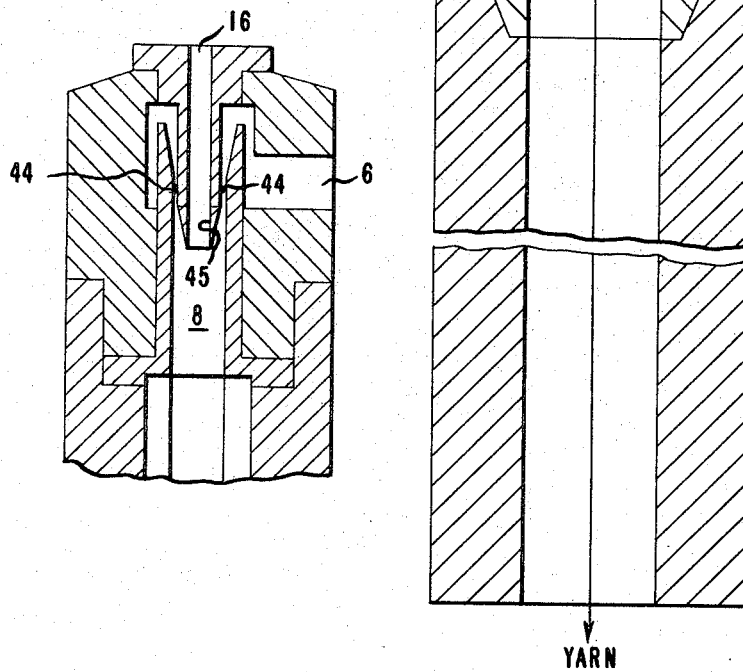

Aug. 29, 1967  G. A. KINNEY  3,338,992
PROCESS FOR FORMING NON-WOVEN FILAMENTARY STRUCTURES FROM
FIBER-FORMING SYNTHETIC ORGANIC POLYMERS
Filed Dec. 21, 1965
8 Sheets-Sheet 5
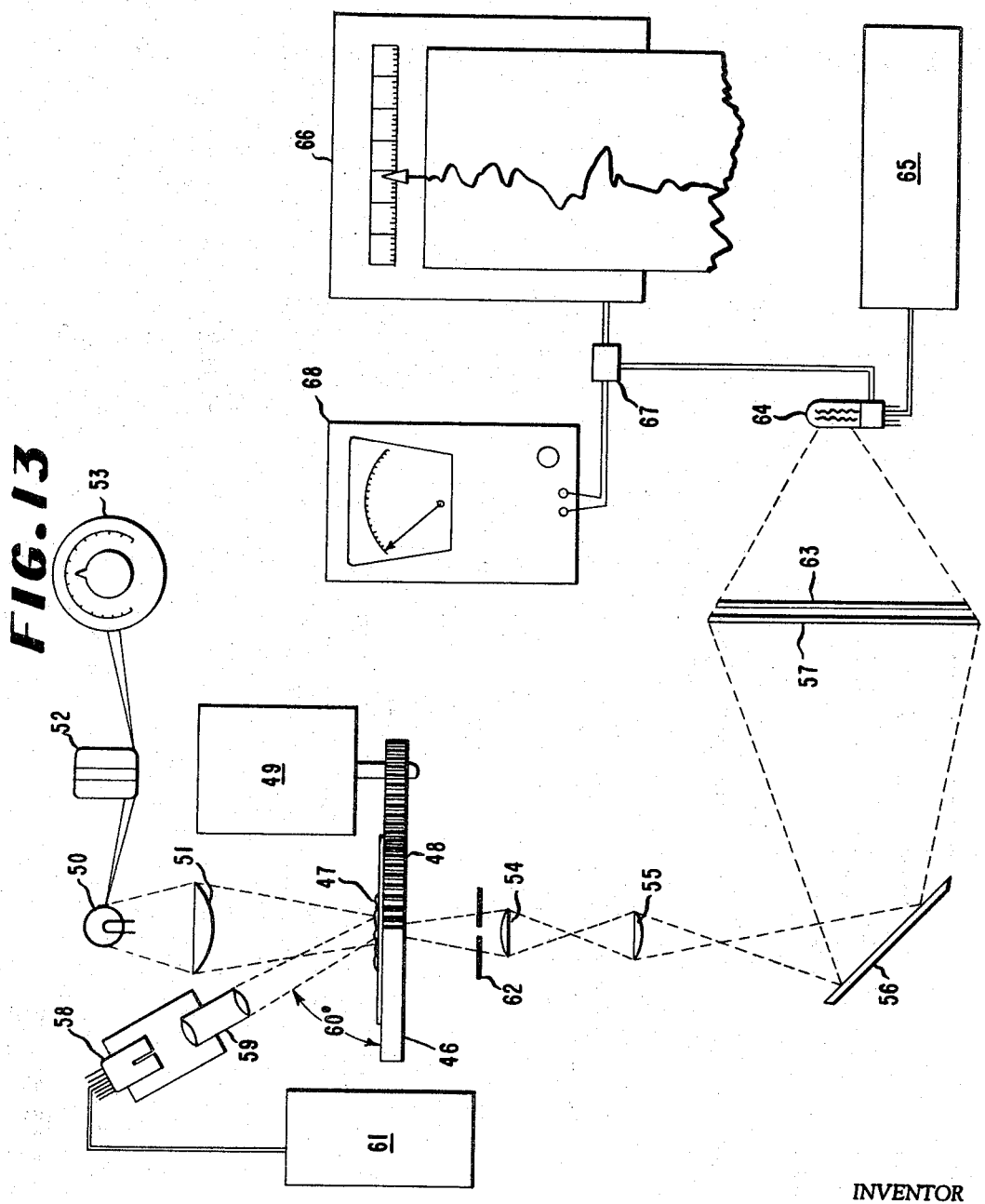
INVENTOR
GEORGE ALLISON KINNEY
BY
ATTORNEY

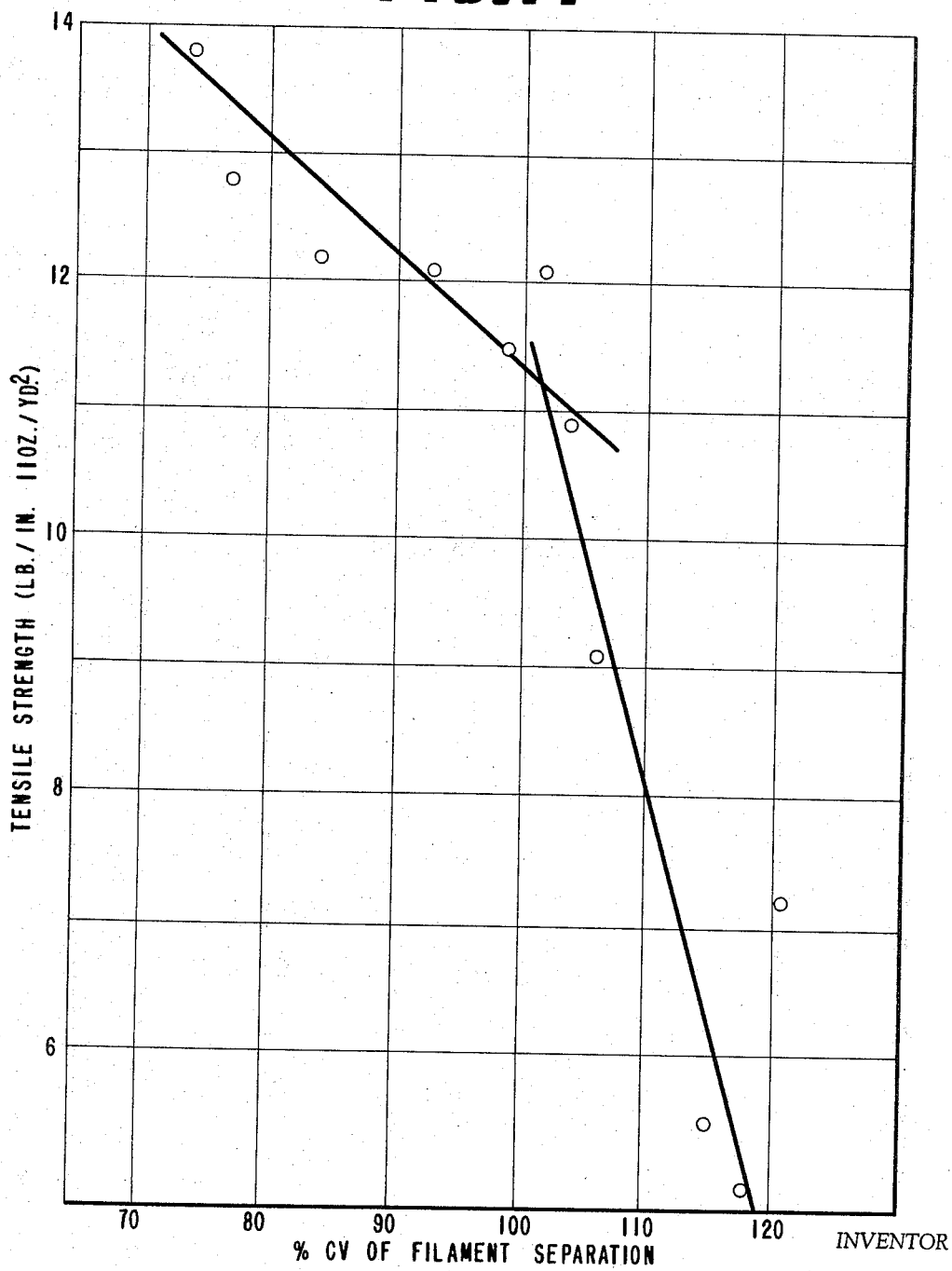

Aug. 29, 1967  G. A. KINNEY  3,338,992
PROCESS FOR FORMING NON-WOVEN FILAMENTARY STRUCTURES FROM
FIBER-FORMING SYNTHETIC ORGANIC POLYMERS
Filed Dec. 21, 1965  8 Sheets-Sheet 7

INVENTOR
GEORGE ALLISON KINNEY
BY Sol Schwart
ATTORNEY

Aug. 29, 1967    G. A. KINNEY    3,338,992
PROCESS FOR FORMING NON-WOVEN FILAMENTARY STRUCTURES FROM
FIBER-FORMING SYNTHETIC ORGANIC POLYMERS
Filed Dec. 21, 1965    8 Sheets-Sheet 8
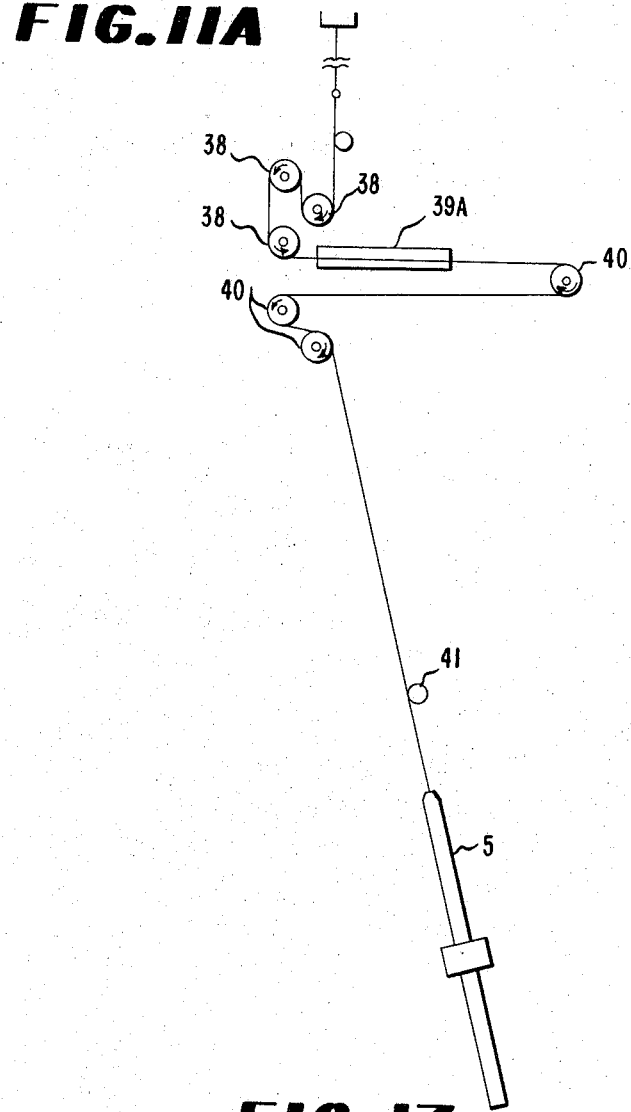
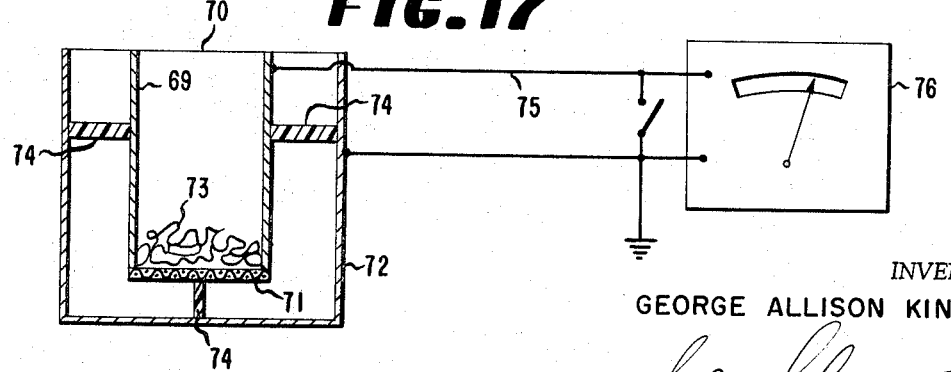
INVENTOR
GEORGE ALLISON KINNEY
BY
ATTORNEY

United States Patent Office 3,338,992
Patented Aug. 29, 1967

3,338,992
PROCESS FOR FORMING NON-WOVEN FILAMENTARY STRUCTURES FROM FIBER-FORMING SYNTHETIC ORGANIC POLYMERS
George Allison Kinney, West Chester, Pa., assignor to E. I. du Pont de Nemours and Company, Wilmington, Del., a corporation of Delaware
Filed Dec. 21, 1965, Ser. No. 515,308
20 Claims. (Cl. 264—24)

This application is a continuation-in-part of copending application 345,792, filed February 18, 1964, and now abandoned, which in turn is a continuation-in-part of application S.N. 200,257, filed June 5, 1962, and now abandoned, which in turn is a continuation-in-part of applications S.N. 859,661 and S.N. 859,614, both filed December 15, 1959, and now abandoned; and is also a continuation-in-part of copending application S.N. 439,361, filed March 12, 1965, and now abandoned, which in turn is a continuation-in-part of application S.N. 133,736, filed August 24, 1961, and now abandoned.

This invention relates to the preparation of nonwoven filamentary structures and more particularly to the preparation of such structures from continuous synthetic organic polymer filaments in a single rapid and continuous operation.

In the preparation of nonwoven webs, sheets, and like structures from staple-length fibers, conventional processing involves the use of carding, air-borne random deposition of staple fibers or adaptations of paper-making techniques to form a preliminary structure. Suitable finishing operations impart the desired tensile and aesthetic characteristics to the structure and enable the structure to be handled without deterioration. Such forming techniques are not applicable to the preparation of analogous structures from continuous filaments.

Commercially feasible procedures which permit collection of continuous filaments as unwoven webs in which the filaments are well separated and laid down in a random fashion have not been available. Procedures which are inherently poorly controllable or are incapable of producing nonwoven webs at an economically acceptable rate have been practiced such as aspirating or piddling the individual filaments onto a receiver, as in the glass-fabricating art. Another method has been to gather individual filaments into a tow, then open the tow and arrange the aggregate of filaments into a web of generally the required configuration and dimensions. The webs formed thereby do not, however, have the constituent filaments well separated and laid down in a random manner and, therefore, they are not suited for utilization in applications where uniformity of appearance, high tensile strength and isotropic character are important. Moreover, webs ordinarily cannot be prepared by this process in an operation fully integrated with spinning. One reason for this is the quite high rates at which continuous synthetic polymeric filaments presently are prepared. Another more important reason concerns the nature of filaments freshly formed or as-spun from the melt, which filaments are generally weak and not suited as such for textile uses until drawn. The drawing operation is usually apart from spinning. If, however, the drawing operation could be suitably coupled with spinning and especially if procedures were available which would permit collection of continuous filaments as webs from multifilament bundles in a controlled manner, useful continuous filament nonwoven structures could be prepared in a single rapid and continuous operation. The efficiency of such an operation would exceed that of presently practiced techniques.

One object of this invention is to provide a method for preparing useful nonwoven webs of oriented, continuous filaments.

A further object of this invention is to provide a process whereby freshly formed continuous synthetic organic polymeric filaments can be collected in a controlled manner as useful nonwoven webs.

A still further object is to provide a method wherein continuous filaments are collected as a nonwoven web in which the filaments are well separated and randomly disposed.

Another object of this invention is a method whereby electrostatic effects are utilized to control the formation of continuous filament nonwoven structures.

An ancillary object is such a process wherein the filaments are charged prior to their formation into useful nonwoven structures.

According to the instant invention, a moving multifilament bundle of at least 20 continuous synthetic organic filaments capable of holding an electrostatic charge is charged electrostatically to a potential sufficient to separate each filament from adjacent filaments and then while thus separated, the filaments are collected as a random nonwoven web. The level of electrostatic charge which is required to provide sufficient separation of the filaments so that a uniform, nonblotchy, web is obtained is at least 30,000 c.g.s. electrostatic units (e.s.u.) per square meter of filament surface as measured in a pail coulometer as hereinafter described. It is desired that the yarn or other multifilament bundle being treated, possesses zero twist so that separation and random laydown are readily effected. In one embodiment the charged filaments are forwarded toward a receiver maintained at a potential differing from that of the filaments, and collected into a useful structure on the receiver. Charging is accomplished while the filaments are under sufficient tension so that they do not separate until such tension is released, i.e., after they have been urged toward the receiver, whereupon they immediately separate and are then collected. The receiver may be solid or foraminous, i.e., a plate, screen, belt, or the like, and may be caused to move continuously or intermittently, with or without reciprocal and/or circular motion to further control the character of the nonwoven structure during its preparation.

The filaments may be charged by a corona discharge maintained in their vicinity, by triboelectric contact with a suitable guide means, by field charging of the molten filaments or by other suitable electrostatic methods. In one embodiment, freshly formed melt-spun synthetic organic filaments are charged triboelectrically and are simultaneously oriented with a pneumatic jet, the action of which also serves to forward the charged filaments toward the receiver. In another embodiment, the filaments are charged by a continuous corona discharge maintained near the filament bundle upstream from the pneumatic jet. The corona discharge device may be an annular (with respect to the filament bundle) member having circumferentially spaced points to bring about the discharge or may be a linear member which the filaments contact lightly as a ribbon and, which is spaced apart from a line of points on a charged electrode. In still another embodiment, freshly formed (molten) synthetic organic filaments with a specific resistivity less than about $10^{10}$ ohm-cm. at a temperature above their solidification point are electrostatically charged by passing through a high-intensity electric field. The filaments are then simultaneously quenched thus "freezing in" the charge and oriented with a pneumatic jet which also serves to forward the charged filaments to the receiver.

Continuous synthetic filaments which are capable of holding an electrostatic charge sufficient to separate the filaments from each other include those comprised of polyamides, such as poly(hexamethylene adipamide), polycaproamide and/or copolymers thereof; polyesters, such as poly(ethylene terephthalate), poly(hexahydro-p-xylene terephthalate), and/or copolymers thereof; polyhydrocarbons, such as polypropylene, polyethylene; polyurethanes; polycarbonates; polyacetals; and the like. The particular method selected in charging the filaments will of course depend at least in part upon the chemical constitution and physical state of the filaments to be charged as well as economic considerations such as availability of apparatus, cost, etc.

In the operation of the process of this invention, the electrostatic charging of the filaments is carried out while they are under tension. Tension not only assists in attaining a uniform charge level on the filaments but also prevents them from separating prematurely and entangling with themselves or with the charging means or other solid surfaces, thereby causing disruption of the process. Since in most operable charging methods the filaments contact a solid surface, a forwarding tension applied beyond the point of charging is required to move them past the charging device and toward the filament laydown zone. However, not only must the forwarding tension accomplish these objectives, it must also be capable of being released after the filaments have been directed toward the laydown zone. Pneumatic jets are used for providing the forwarding tension since the tension on the filaments is released shortly after the filaments exit from the jet. Release of the tension permits the charged filaments to separate in all directions and thus to deposit as a nonwoven web which is essentially free from filament aggregates.

If the formation of nonwoven webs by the process of this invention is to be practical, it is necessary that a bundle of at least 20 parallel, or at least partially parallel, continuous filaments be employed per pneumatic jet device used for forwarding the filaments. In order to obtain sufficient separation of the filaments in such a bundle so that, after release of the forwarding tension, they can be deposited as a uniform, strong nonwoven web, the level of electrostatic charge on the filaments must be above 30,000 e.s.u. per square meter of filament surface. The effect of charge level on the separation of the filaments depends on the mass of the filaments. By specifying the charge level on the basis of filament surface area, the charge level includes a factor which is dependent on the denier and density of the filaments. The above-specified charge level is applicable to continuous synthetic organic filaments of textile denier (for example, 0.1 to 30) from polymers having a density of from about 0.8 to 1.5 g./cm.$^3$. The charge level applies, therefore, to filaments of such polymers as polypropylene, poly(hexamethylene adipamide), and poly(ethylene terephthalate).

The degree of separation of the filaments in the nonwoven web can be defined by the coefficient of variation of filament separation distances, as hereinafter described. When this coefficient of variation ($CV_{fs}$) is less than about 100%, the filaments are sufficiently separated so that consistently strong, uniform nonwoven webs are obtained. At values of $CV_{fs}$ above 100%, there is a rapid drop in tensile strength of bonded nonwoven sheets having the same filament strengths. Likewise, above this level, there is a significant and rapid deterioration of uniformity of appearance, as measured by the formation value, as hereinafter described, of the nonwoven webs. Wide fluctuations in uniformity and unsatisfactory product appearance are obtained with webs having a $CV_{fs}$ greater than 100%. In order to obtain this level of filament separation and the accompanying desirable properties of high tensile strength and uniformity in continuous-filament nonwoven webs, it is necessary that the electrostatic charge on the filaments as they exit from the filament-forwarding jet device, be at least 30,000 e.s.u. per square meter of filament surface.

Prior art methods which used electrostatic techniques in the handling of filamentary materials, as exemplified by Taylor, U.S. Patent 2,036,838, Taylor, U.S. Patent 2,067,251, Taylor, U.S. Patent 2,399,258 and Bennett et al., U.S. Patent 2,491,889, were not concerned with the formation of uniform nonwoven webs, did not recognize the critical nature of the charge level required to obtain such webs, and, moreover, were carried out under conditions which would not yield this level of charge.

In order to obtain a web in which the filaments are randomly disposed, the speed at which the filaments are forwarded toward the laydown zone should be greater than the speed at which the means for collecting the filaments is moved away from the laydown zone. Normally, the ratio of the filament-forwarding speed to the speed of the collecting means should be at least 5:1 and preferably is in the range of 15:1 and greater. The movement of the collecting means should not supply any portion of the forwarding tension used to restrain the filaments during the charging and to urge them toward the collecting means. A process such as disclosed in Taylor, U.S. Patent 2,399,258, in which the collecting means provides the forwarding tension for a bundle of filaments, e.g., where the ratio of the filament-forwarding speed to the speed of the collecting means is about 1:1, inherently forms a highly directional nonrandom web even if the filaments are well-separated.

The invention will be more readily understood by referring to the attached drawings, wherein:

FIGURE 7 shows a schematic representation of a typical product of the invention;

FIGURE 8 shows schematically an assembly of apparatus useful in carrying out the process of charging incipient filaments of polymer exhibiting a specific resistivity of below $10^{10}$ ohm-cm. at 200° C. as described above;

FIGURE 9 shows in longitudinal section a pneumatic jet which may be used in combination with the apparatus of FIGURE 8;

FIGURE 10 is a diagrammatic representation of a single filament as freshly spun, illustrating the various stages in its transition from liquid to solid;

FIGURE 11 shows schematically alternative-apparatus assemblies wherein the filaments are drawn either mechanically with draw rolls or by a pneumatic jet and wherein the filaments are electrostatically charged with a corona discharge device;

FIGURE 11a shows schematically an alternative assembly for mechanically drawing filaments;

FIGURE 12 shows schematically in longitudinal section, the nozzle portion of a pneumatic jet which may be used with either embodiment of the apparatus in FIGURE 11;

FIGURE 13 shows schematically an optical apparatus suitable for the determination of the randomness of nonwoven webs;

FIGURE 14 shows graphically the relationship between the tensile strength and the coefficient of variation in filament separation distances for a series of nonwoven webs having the same filament strength;

FIGURE 17 is a sketch of a pail coulometer and associated electric apparatus suitable for determining the electrostatic charge on synthetic organic filaments.

Figure 1:
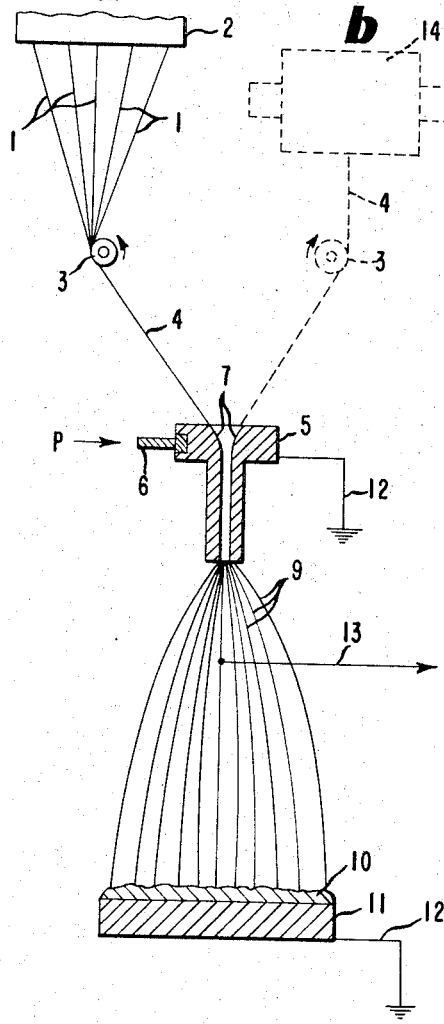
FIGURES 1a and 1b show schematically alternative-apparatus assemblies useful in practicing the invention on freshly spun and lagged yarn, respectively.

Referring to FIGURE 1a, freshly formed filaments 1 are spun through spinneret 2 and pass freely, i.e., nonsnubbing idler roll 3, whereupon the filaments 1 are converged into yarn or bundle 4. Yarn 4 then is pulled through pneumatic jet 5, which is continuously supplied with air under pressure through air inlet 6, making triboelectric contact with the tapered inlet section or throat 7 thereof. Optionally, the filaments 1 may pass directly to pneumatic jet 5 without prior convergence to a yarn provided that they (the filaments) make sufficient triboelectric contact with throat 7 of jet 5 (i.e., provided that the spinneret 2 and jet 5 are not disposed in-line with respect to one another). Jet 5 (and hence the throat 7 portion thereof) is electrically grounded through lead 12. The charged filaments 9 issuing from jet 5 are collected as sheet 10 on receiver 11, which in this embodiment, is grounded through lead 12. The repelling effect due to the charge on the filaments 9 exiting jet 5 is indicated diagrammatically by the arrow 13 emanating from within the filament region.

Alternatively, as shown in FIGURE 1b, yarn 4 may be supplied to pneumatic jet 5 from a package 14, prior to which the yarn has been rendered receptive to charging (i.e., in a relatively anhydrous condition free from charge-diminishing contaminants or finishes). Preferably, the yarn is taken off the side of the package to minimize twisting of the yarn, which otherwise would inhibit subsequent filament separation.

Figure 2:
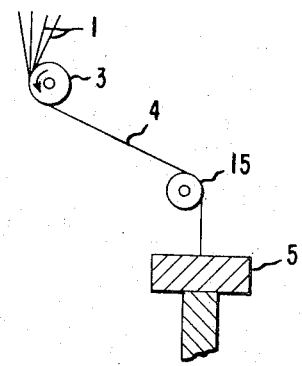
FIGURE 2 shows a modification of the FIGURE 1 apparatus.

FIGURE 2 shows a modification of the FIGURE 1 apparatus wherein the yarn is charged triboelectrically by contact with guide 15 located intermediate roll 3 and jet 5 (shown fragmentarily). Guide 15 is composed of a material which is capable of producing sufficient charge on the filaments in yarn 4 to separate the filaments from each other and maintain that separation until the filaments strike the receiver. Guide 15 is located above jet 5 so that the charged yarn enters the jet axially. Guide 15 may be slowly rotated and/or traversed to reduce surface wear; it can be a circular pin as shown or may be a bar or the like. A certain degree of snubbing takes place on passing guide 15, depending on the coefficient of surface friction and the angle of wrap made by the yarn over the surface thereof. Additional snubbing would result from fixing roll 3 or its equivalent.

Figure 3:
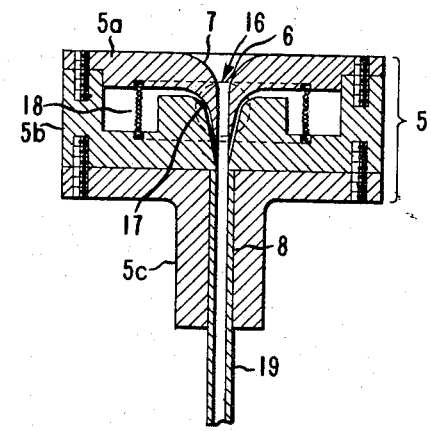
FIGURE 3 shows in longitudinal section a pneumatic jet which may be used in combination with the apparatus of FIGURES 1 and 2.

FIGURE 3 shows in longitudinal section a pneumatic jet which can be used with the apparatus of FIGURES 1 and 2. Jet 5 is assembled from components 5a, 5b, and 5c with cap screws (not shown). The assembled jet consists of essentially cylindrical yarn passageway 8 (the extension 19 of which is shown fragmentarily) which is outwardly flared toward filament inlet 16 in entrance section 5a to form a guide throat 7. Air under pressure is supplied through air inlet 6 to the plenum 18 and enters filament passageway 8 through the annular slit 17. In the present embodiment, the air passing through slit 17 encounters the filaments at an angle of about 15° thereto, whereby a forwarding motion is imparted to the filaments. The composition of entrance section 5a (hence guide throat 7) is important to over-all process results; in the present embodiment, entrance section 5a is readily interchangeable.

Figure 5:
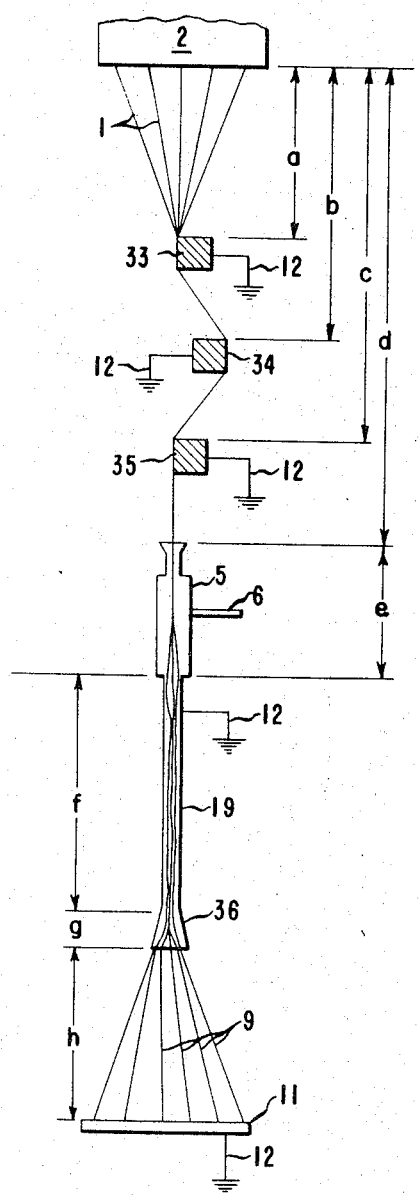
FIGURE 5 shows another modification of the apparatus of FIGURE 1.
Figure 6:
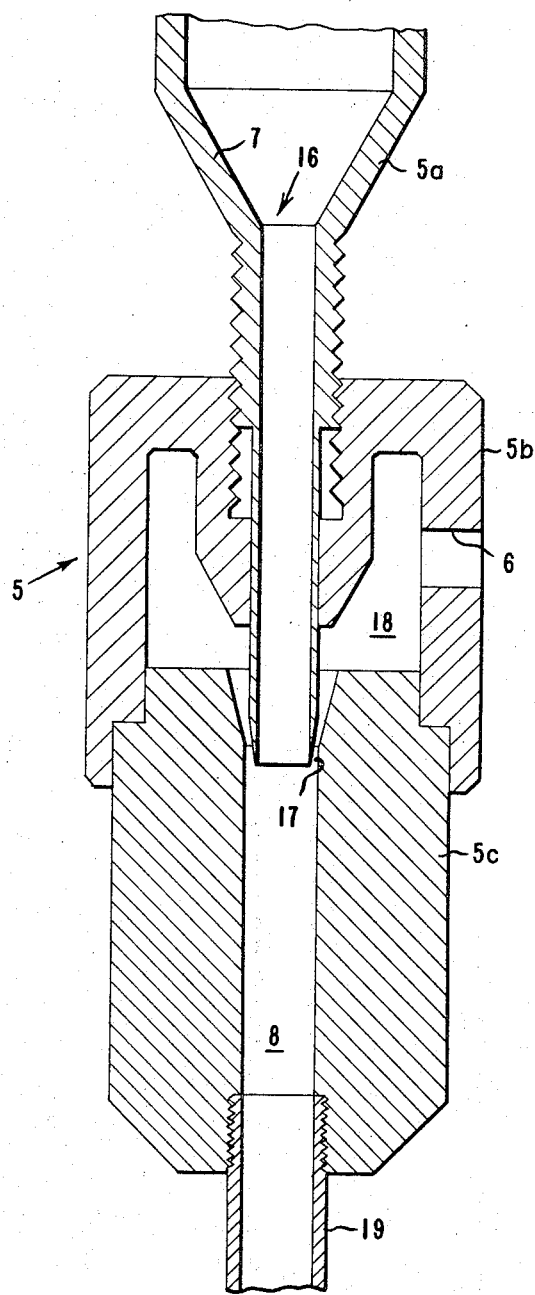
FIGURE 6 shows in longitudinal section a pneumatic jet which may be used with the apparatus of FIGURE 5.

Referring to FIGURE 5, freshly formed filaments 1 are spun through spinneret 2, pass as shown over bar guides 33, 34 and 35 thence to pneumatic jet 5 supplied with air under pressure through inlet 6. Pneumatic jet 5 embodies extended filament passageway extension 19 flared outwardly at the terminus 36. The charged filaments 9, which separate on exiting the extension of jet 5, are collected on receiver 11, an aluminum plate. The various components downstream from spinneret 2 are grounded through leads 12. Pneumatic jet 5 is drawn in greater detail in FIGURE 6 wherein the reference numerals have substantially the same significance as those in FIGURE 3.

In operation with the apparatus of FIGURES 1 and 5, the yarn, i.e., the filament bundle, is forwarded from the supply means and urged to the receiver means by the action of the pneumatic jet. In the case of freshly spun filaments, the jet is located beyond the point where the filaments are substantially completely solidified or "quenched," as are usually the associated guide means unless they are of the nonsnubbing variety. These precautions prevent fusing of the individual filaments. Simultaneously, the individual filaments are charged to a high potential, positive or negative, depending on the yarn and guide compositions, by virtue of their triboelectric contact therewith. A similar charging effect results from maintaining a corona discharge in the upstream vicinity of the pneumatic jet. Accordingly, as the filaments issue from the jet and are urged toward the receiver means, they immediately separate, owing to the forces of electrostatic repulsion. Partly due to the forwarding action of the jet air and partly due to the attraction of the filaments toward the grounded or oppositely charged receiver, they are deposited on the receiver as a compact unitary structure, i.e., as the desired nonwoven web.

In the embodiment wherein the electrostatic charge on the individual filaments is developed by the so-called triboelectric effect and results from the intimate rubbing contact of the running filaments with the guides and/or with the throat of the pneumatic jet, the polarity of the charge so induced is governed by the relation of the filament composition and the guide composition in the triboelectric series of materials (see, for example, V. E. Shashoua in Journal of Polymer Science, 33, page 65 (1958)). The quantity or magnitude of the induced charge depends on a number of factors which are not clearly understood. The amount of charge changes with the normal force on the filaments and the speed of the filaments. The amount of charge and the retention thereof also appears highly dependent in an inverse ratio on moisture content of the filaments and, to a lesser extent, moisture in the ambient atmosphere. For that reason, it is preferred that the filaments be relatively anhydrous (generally less than about 5% by weight of moisture) prior to charging. Similarly, conductive finishes on the yarn would negate much of the effect of the charging and are to be avoided. Freshly formed melt-spun filaments are very desirable for use in this invention. Wet- or dry-spun synthetic filaments, such as rayon and polyacrylonitrile, respectively, usually require conditioning prior to utilization within the purview of this invention.

In another embodiment of the present invention, the process comprises melting a fiber-forming synthetic organic polymer which exhibits a specific resistivity less than about $10^{10}$ ohm-cm. at a temperature above the solidification temperature, spinning such polymer from the melt into continuous filaments, electrostatically charging the incipient filaments prior to the complete solidification thereof, orienting the freshly formed filaments, then depositing the oriented and electrically charged filaments onto a receiver having a substantially different electrical charge, preferably a grounded or oppositely charged receiver. The filaments may be oriented and simultaneously electrostatically charged by forwarding them at a rate of from about 500 to about 6,000 yards per minute with an electrostatically charged pneumatic jet located beyond the region of nontacky impressionable tractability of the moving incipient filaments but sufficiently close thereto that the electrostatic field between the jet and the spinneret can induce an electrostatic charge on the filaments. Under these conditions, succeeding sections of the filaments are extruded, electrostatically charged and then oriented.

By the term "region of nontacky impressionable tractability" is meant that region along the length of the extruded filament wherein the solidifying product is in a transitional highly plastic stage between the liquid and solid states. This stage is illustrated by FIGURE 10. As the extruded stream 27 flows from the orifice 26 of spinneret 2, it is initially a liquid, as represented by dot 28. As quenching occurs, the viscosity of the polymer increases and concurrent plasticity of the filament develops, which, upon further quenching, provides a solid filament, indicated by the lines 29. The intermediate region of transitional high plasticity is shown by dashes 30. In this region a state of nontackiness is attained and it is apparent that the stress resulting from the application of the forwarding motion at 31 e.g., by the pneumatic jet, carries back and has the attenuating effect in the area indicated by arrows 32. The optimum point for application of attenuance is readily determined in practice by shifting the forwarding means along the length of the filament until the said means operates at its highest efficiency with least incidence of adherence of adjacent filaments. Quite often this also is the best point for electrostatically charging the filaments since solidification or complete quenching occurs quite rapidly after such attenuation.

Any synthetic organic polymer having a specific resistivity at a temperature above the solidification temperature of less than about $10^{10}$ ohm-cm. may be used in this embodiment of the invention. Preferred polymers include polycaproamide and poly(hexamethylene adipamide), and copolymers and/or mixtures thereof. Poly(ethylene terephthalate) and polypropylene are not operative in this embodiment of the invention unless modified to lower their specific resistivity to the above stated level. Incorporation of as little as 2% by weight of a sulfonated comonomer such as sulfoisophthalic ester during preparation of poly(ethylene terephthalate), however, produces a copolymer which is operative. Similarly, incorporation of a conductive salt, such as an inorganic salt like lithium chloride, during preparation of poly(ethylene terephthalate) is effective. When an additive is employed to increase the conductivity of a polymer, particular attention should be devoted to its compatibility with that polymer and to its stability at the melting point of the polymer. Suitable additional ways to impart conductivity to the freshly formed filaments, or more particularly, to the component polymer involve spinning a conducting (in the melt) sheath about the filaments (see Kilian U.S. Patent 2,936,482) or by utilizing grafting techniques to modify by way of additional polar groups the conductivity of the polymer.

Referring to FIGURE 8, which illustrates the above embodiment of the invention, freshly formed filaments 1 issuing from grounded spinneret 2 are passed through pneumatic jet 5 to which is supplied air under pressure through inlet 6 (air flow indicated by arrow). Pneumatic jet 5 is charged to high positive potential (+E), in the case shown, by a source 20 of electrostatic potential. Source 20 is connected to jet 5 via lead 21 and the opposite-charge pole is grounded through lead 22. Upon passing jet 5, the negatively charged filaments 9 separate and are then collected as sheet 10 on receiver 11 which is supported by means indicated fragmentarily at 23. Receiver 11 is either grounded through lead 12 or, alternatively charged opposite to the charge of filaments 9 via lead 24 from source 20, interrupting then lead 12 to ground at switch 25.

In this method of developing the required electrostatic charge on freshly formed filaments, the preferred potentials for obtaining an electrostatic field of sufficient strength are in the range of 1,000 to 30,000 volts. These potentials are available from a number of suitable sources, e.g., a rectifier generator. Referring to the apparatus shown in FIGURE 8, the field strength is inversely proportional to the distance D between the charging means (in this case, the pneumatic jet) and the spinneret. To maintain a field of constant strength, the electrostatic potential should be increased as the distance D is increased. A field strength of 300 to 4,000 volts/inch is preferred. D should not exceed the distance required for complete solidification of the filaments since otherwise insufficient electrostatic charging of the filaments may result.

FIGURE 9 shows a suitable pneumatic jet for use with the apparatus of FIGURE 8. The jet consists of an essentially cylindrical filament passageway 8 which is outwardly flared at filament inlet 16. This inlet section may be converging but should not be diverging. The jet is supplied with air under pressure through air inlet 6; the air stream enters filament passageway 8 through annular slit 17 and, being directed downward, results in forwarding motion being imparted to the filaments.

As indicated hereinabove, the minimum charge level on the filaments which is capable of giving sufficient filament separation to permit the formation of uniform, high strength nonwoven webs from bundles of at least 20 continuous filaments, is 30,000 e.s.u. per square meter of filament surface. At a given high charge level, the uniformity is diminished by increasing the concentration of the filaments in the jet either by increasing the number of filaments or by using a smaller jet, by using more air in the jet, by increasing the filament speed, and by decreasing the distance between the jet and the web-laydown receiver. The way in which the electrostatic charge functions to permit the formation of uniform webs makes the air velocity and jet-to-laydown distance important. The charge uniformly spreads the bundle of filaments after the tension on the filaments imparted by the jet air has dropped essentially to zero. Both increasing the distance from the jet to the laydown and decreasing the air velocity increase the time available for the charge to spread the filaments and so reduce blotchiness. The air velocity should not, however, be dropped below the point necessary to carry the filaments to the receiver nor can the height be increased to a point where room air turbulence causes the descending filaments to form bunches. When the receiver is located too near the jet, filament collection may be difficult owing to erratic filament action due to the air exhausting from the jet. In extreme cases the filaments may be blown around on the receiver or may form bunches or become entangled. After the filaments are electrostatically charged to a sufficient level, the process requires that (1) the tension be released to permit the filaments to separate due to the repelling effects of the applied charge and (2) the filaments be collected as a random nonwoven web while thus separated.

The foregoing variables are normally maintained within the following limit:

Cross-sectional jet throat area occupied by filaments _____ 0.04–24%.
Filament speed _____ 200–10,000 y.p.m.
Air velocity (at jet exit) _____ >50% of the filament speed.
Distance from jet exit to laydown __ 5–72 inches.

Even when all these variables are at their optimum values, however, it is still necessary for the charge level on the filaments to exceed 30,000 e.s.u. per square meter of filament surface in order to obtain a uniform web at any economically practical rate of productivity.

Figure 4:
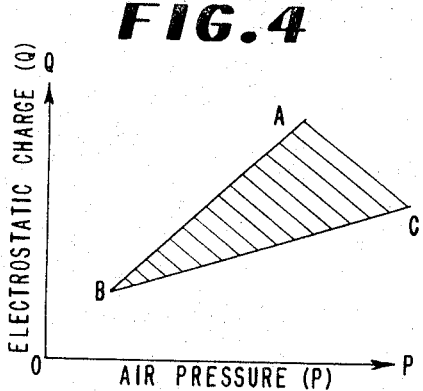
FIGURE 4 shows graphically the relationship between important process variables, indicating the region of optimum operability.

In the operation of the process of this invention it is preferred to use as high an electrostatic charge as possible in order to obtain the best separation of the filaments. There is, however, a maximum charge that the filaments can hold before a voltage breakdown occurs and the charge leaks off the filaments. In addition, as the charge is increased, the filaments are attracted more strongly to the walls of the pneumatic jet used to forward the filaments. Operability of the process depends to a considerable extent on maintaining the filaments separate from the wall. This may be accomplished by maintaining a balance between the forces attracting the filaments to the walls of the pneumatic jet and the forwarding forces provided by the pneumatic action of the air supplied to the jet. This requires that the pressure of the air which is supplied to the jet be sufficient so that the forwarding action of the jet prevents the filaments from contacting the walls of the filament passageway. By a recently developed process, which forms no part of the present invention, filament contact with the jet walls may also be avoided by generation of thick boundary layers of air adjacent to the jet walls, thus permitting the use of the desired high electrostatic charges on the filaments. FIGURE 4 shows diagrammatically the effect of increasing electrostatic charge and air pressure on the efficiency of sheet collection. Referring to FIGURE 4, electrostatic charge Q is indicated along the ordinate OQ and is plotted against air pressure P along the abscissa OP. The resulting generalized plot shows a region of optimum web formation between the lines AB and BC and their extensions. The exact position of these lines depends on such factors as polymer identity, filament denier, design and dimensions of the pneumatic jet, and the like; they are used in FIGURE 4 to depict a generalized spinning operation, based in the present instance on filaments composed of poly(hexamethylene adipamide). In the region below line BC, satisfactory sheets generally cannot be formed, owing primarily to an insufficiency of charge on the filaments. The value of the ordinate at B must be at least 30,000 e.s.u. per square meter of filament surface. In the region above and to the left of line AB, the charge on the individual filaments becomes excessive for the particular jet being used and hence they begin to adhere to the jet, leading to poor operability and, in extreme cases, disruption of the process. This point of maximum operable charge depends on such factors as the relative humidity of the ambient atmosphere, rate of filament throughput, and the like. In practice, it is preferred to operate as close to the line AB as is practical, commensurate with over-all process operability. This requires establishing and maintaining a suitable balance of forces, electrostatic and pneumatic.

An empirical relationship between web uniformity, as expressed by the formation value (FV), hereinafter described and certain process variables, namely charge level, number of filaments and air velocity (in the throat of the filament-forwarding jet device), has been shown to exist namely, that the formation value increases directly with the square of the charge on the filaments and inversely with the number of filaments per jet device and the square of the air velocity.

The receiver employed to collect the charged filaments as a nonwoven web may assume a variety of forms. It may be a grounded conductor, to take advantage of the attraction of the charged filaments thereto, which renders the collecting operation highly controllable. Optionally, the receiver may be charged opposite to that of the running filaments, to increase their attraction thereto. It should be noted that when the receiver is charged opposite to the filaments, it often bears the same polarity as the pneumatic jet or other charging means, since the running filaments may assume a charge opposite to that of the charging means. It may often be convenient, therefore, to electrically connect the receiver to the same source of potential as the jet or other charging means. If desired, a dielectric material may be placed over the receiver, onto which the filaments are collected and subsequently utilized. The receiver should be located at a suitable distance from the jet, as explained hereinabove, this distance being determinable through normally routine experimentation. The receiver may be a solid member or a foraminous one, the latter variety affording ease of filament laydown owing to facile passage therethrough of the aspirating air. A foraminous receiver may also be used to aid filament laydown by application of suction below the laydown area. Motion of a variety of modes may be imparted to the receiver during the collecting operation. The pneumatic jet may also be in motion relative to the receiver. Other possibilities in the realm of collecting techniques will be apparent to those undertaking the practice of this invention.

As indicated hereinabove, the pneumatic jet serves two important purposes. First, it imparts a certain amount of tension to freshly spun filaments, which tension serves to attenuate, hence orient them. In the case of filaments supplied from a package or from mechanical drawing means, the pneumatic jet provides the necessary forwarding impetus which is at least 0.05 g.p.d. Second, the jet functions to urge the charged filaments toward the receiver and in the case of filaments which have not yet solidified, serves to quench them as well. In general, such jets are constructed so as to provide an annular stream or, in the case of slot jet, two flat streams of high velocity air or other suitable fluid in a direction cocurrent with and at a small angle to that of the filaments. The jet should be designed to avoid turbulent flow which leads to entangled and bunched filaments and nonuniform webs. Modifications of the aspirating or "sucker-gun" variety may be employed. Representative of such apparatus are the ones shown, for example, in U.S. Patents Nos. 2,638,146 and 2,639,487. The ability to forward or "pull" may be increased for any given jet design by extending the downstream (past the air inlet) section of the filament passageway. Such extension should not, however, exceed the point at which the onset of turbulence in the jet is indicated by nonuniformities in the product. Depending on design, a single jet may accommodate the output (filaments) of more than one spinneret, the filaments from each spinneret being guided to the common jet by suitable guide means. Alternatively, the filaments from a single spinneret may supply several jets.

The process of this invention makes possible the preparation of a family of useful sheet-like structures based on continuous synthetic filaments. These structures are characterized by the substantial absence of filament aggregates, that is, the filaments are separate and independent of each other, as defined by a coefficient of variation of filament separation distances ($CV_{fs}$) of less than about 100%.

In order to measure the distances between filaments in a nonwoven web so that the $CV_{fs}$ can be calculated, it is often necessary to section the structure longitudinally. This may be done with unbonded webs by simple delamination; however, with bonded webs, this is not satisfactory since the initial structure is disturbed in the delamination procedure. Satisfactory sections can be obtained by a technique which involves embedding a 2 in. x 0.5 in. sample of web in a curable epoxy resin composition. After curing overnight, the sample can be sliced longitudinally with a microtome into sections 30 to 40 microns thick. This method has been found to be satisfactory for both bonded and unbonded webs. The distances between the filaments are then measured with a projection microscope set at 100× magnification for filaments having a denier of 4 or less and at 50× magnification for filaments having a denier greater than 4. Separation distances are measured along a line which covers at least 2 in. of the web; preferably, however, at least 3 in. of web are scanned in which case it is necessary to embed two samples of the web. The filament segments involved in the count are those which are perpendicular within ±2° to the line of count. At least 200, and preferably 400 filaments are counted in order to characterize a given sample. The precision of the coefficient of variation which is calculated from the filament distances is of the order of ±3%.

The filament separation can also be characterized by a bunching coefficient (BC) of 0.7 or greater. The bunching coefficient concept is based on the premise that where individual fibers, disposed in the same direction in a nonwoven web, are uniformly spaced from each other, each "fiber space" will contain one fiber. This concept was developed by D. R. Petterson, and is described in his Ph. D. thesis, "On the Mechanics of Nonwoven Fabrics," presented to the Massachusetts Institute of Technology in 1958.

The basic equation is:

$$BC = \frac{\text{Number of "fiber spaces" occupied by fibers}}{\text{Total number of "fiber spaces" available}}$$

Where all fiber elements are completely parallel, and exactly uniformly spaced, the bunching coefficient is unity. The actual bunching coefficient may be determined by taking a photograph of the web, ordinarily of a sample not greater than 5 mils thick, and counting the number of fibers crossing a given line segment at right angles to that line (using an angular tolerance level of not over 2° in considering or not considering each fiber). The total number of fibers counted is equal to the total number of "fiber spaces" in that line segment. The average "fiber space" width is calculated by dividing the segment length by the number of fibers. A scale is now constructed, with unit distances equal to the average "fiber space" width. With this scale, the number of fiber spaces occupied by at least one fiber is determined. For accurate results, measurements are made in several directions, and averaged.

Bunching coefficient is insensitive to the location of the filaments within the fiber spaces, and thus is not preferred for the accurate measure of the structural characteristics of the web. The distribution of distances between essentially parallel filament segments, $CV_{fs}$ does directly describe the structure, and has been found to be a far more exact measure of filament separation.

The webs produced by the process of this invention and having a $CV_{fs}$ of less than about 100% have a high level of uniformity as evidenced by a formation value, designated FV, of greater than 100. FV of the bonded nonwoven sheets, is measured with a Paper Formation Tester (M. N. Davis et al., Technical Association of the Pulp and Paper Industry, Technical Papers, Series 18, 386–391 (1935)). As a standard for determination of FV, a suitable number of sheets of 1oz./yd.$^2$, onion-skin paper are combined to give a basis weight within 0.5 oz./yd.$^2$ of the samples to be examined.

Another characteristic common to the structures produced by the process of this invention is the random disposition of the component filaments within the sheet. By "random" is implied the substantial absence of any anisotropy in the arrangement of the individual filaments. A suitable test for randomness involves cutting representative square samples from the sheet under consideration as indicated in FIGURE 7 and then counting the number of filaments terminating at each side of the square. In a random sheet of uniform basis weight, approximately the same number of filaments will be encountered along each side of the square, regardless of the location or orientation of the square within the plane of the sheet. Such randomness obtains in the instant sheets independent of the particular process embodiment employed or the nature of the receiver utilized.

A more precise and preferred test for randomness will determine the actual orientation or direction in which the component filaments lie within the plane of the nonwoven sheet. For a random sheet, there will not be a predominant orientation of the filaments within the sheet, or expressed alternatively, there will be, on the average, as many filaments lying in one direction as in any other direction. The method described by J. W. S. Hearle and P. J. Stevenson in the Textile Research Journal, November 1963, pp. 879–888, determines the randomness of a nonwoven sheet according to the preferred test. This method requires the counting and plotting of a large number of filaments in order to obtain accurate and reproducible results and is, therefore, very time-consuming. In this respect, it is similar to the above-described randomness measurement in which the number of filaments terminating at each side of a square is determined. It is further noted that, whereas the actual visual measurement of filament orientation is readily applicable to nonwoven sheets in which the fibers are predominately straight, it is not as satisfactory for sheets in which the fibers are curved or crimped.

Instead of counting the number of filaments oriented at the various directions within the nonwoven sheet, it has been found that measurement of randomness can be obtained by determining the total length of the filament segments that are oriented at the various directions throughout the sheet. Thus, for a random sheet, the total length of filament segments at any one orientation is the same as at any other orientation. This measurement has the advantage that it is universally applicable to straight, curved, or crimped fibers; thus, it is of special value in determination of randomness of the continuous filament nonwoven sheets prepared by the process of this invention.

It has been found that the measurement of the length of filament segments at the various orientations can be made rapidly and accurately by an optical method. The method is based on the principle that only the incident light rays which are perpendicular to the fiber axis of a round fiber are reflected as light rays which are perpendicular to the fiber axis. Hence, by focusing a beam of parallel light rays on a nonwoven sheet at an incident angle less than 90°, e.g., 60°, the light which is emitted perpendicular to the plane of the sheet comes only from filaments having an orientation within the plane of the sheet which is perpendicular to the incident light rays. By collecting and measuring photoelectrically the intensity of the light, the total length of the filament segments perpendicular to the light rays, therefore, parallel to each other, can be determined. By rotating the sheet, the parallel filament segments for any given direction can be measured and from this measurement, an analysis of the randomness can be made.

An apparatus suitable for this measurement is shown schematically in FIGURE 13 and will hereinafter be referred to as a randometer. A detailed description of the components, the method of operation, and the method for standardizing the characterizations are given below.

As shown in FIGURE 13, the apparatus has a revolving stage 46 on which the sample 47 to be examined is placed. Stage 46 is modified by gear 48 which has half the teeth removed so that when driven by synchronous motor 49, it rotates only 180°. Stage 46 rotates at ¼ r.p.m., thus the time for rotation of the sample through 180° is 2 minutes. Lamp 50 is located directly over the sample and in line with magnifying lens system 51. Lamp 50 is a 6-volt lamp and its intensity is controlled through 6-volt transformer 52 and variable-voltage transformer 53. The light from 50 is focused by lens 51 onto the bottom of the sample, and when projected through objective lens 54, eyepiece 55 and reflected from mirror 56, gives a shadow of the sample on ground-glass screen 57 at a magnification of 36×. Screen 57 is circular and has a diameter of 6.9 inches.

A second lamp 58 is mounted in a housing with projection lens 59, the housing being positioned so that the light is focused on the sample at an angle of 60°. Lamp 58 is a 25-watt, concentrated arc lamp receiving its power from power supply 61 which is modified to eliminate the A.C. ripple. The filaments or segments of filaments which are perpendicular to the light from lamp 58 reflect the light into the magnifying lens and mirror system to screen 57 for measurement. Optical slit 62 is located between the objective lens 54 and stage 46 and serves as a diaphragm to limit the amount and the angle of the light reflected from the sample. The slit is 1/16 in. x 3/8 in. and is mounted with its long axis parallel to an imaginary line which is perpendicular to the light from lamp 58 and within the plane of the sample.

The light from the screen is focused by Fresnel lens 63 onto photomultiplier tube 64 (RCA type 1P21) having a 2500 volt DC power supply 65. The screen, Fresnel lens, and photomultiplier tube are contained in a single light-tight unit, which can, however, be opened for visual observation of the screen. The output from the photomultiplier tube is fed into a microampere recorder 66 having a chart speed of 8 in./min. and a chart 9.5 in. wide. The chart records the light reflected from the parallel filaments at each direction as the sample is rotated through 180°. The sensitivity of recorder 66 should be adjusted so that a current of 6 microamperes gives 100% pen deflection.

A two-way switch 67 is in the line from the photomultiplier tube to the recorder so that the signal can be measured on a sensitive microampere meter 68, if desired. This meter can also be used in conjunction with a 6-volt lamp of fixed intensity to measure the fiber density of the sample so that, if desirable, all samples can be compared on the same basis.

Samples of the nonwoven sheet to be examined are preferably unbonded and should permit clear viewing on the randometer of all the filaments through the thickness of the samples. A preferred basis weight range for sheets of 3 denier filaments is 0.75–1.5 oz./yd.² Samples in excess of 1.5 oz./yd.² should be delaminated to fall within the range stated, but care should be exercised to avoid the introduction of directionality due to the delamination. The delaminated specimen should be representative of the total thickness. The sample is placed between two microscope slides which are then taped together. The slide is placed on the revolving stage so that the light from lamp 58 shows on the sample. The background lamp 50 is then turned on and the filaments are focused as sharply as possible by moving revolving stage 46 up or down, while they are viewed on the screen. Lamp 50 is then turned off. Stage 46, lamp 58 and projection lens 59 are enclosed in a light tight unit. The voltage of power supply 65 is adjusted to give about 5 in. pen deflection and the intensity of the reflected light is recorded on the microampere recorder chart as the sample is rotated through 180°.

The heights of the intensity-orientation curve so obtained are measured in inches from the zero line of the chart at 80 equally spaced orientations and the arithmetic mean of these heights is determined. To standardize the randometer characterization, each of the 80 readings is multiplied by the factor $$\frac{5}{\text{arithmetic mean}}$$

to shift the curve to a standard mean (5 in.). The standard deviation of these 80 corrected readings from this standard mean is the calculated. A "perfectly" random sheet would have a standard deviation of zero when the reflected light is measured at all orientations. As used herein, a random sheet is defined as one having a standard deviation of 0.6 in. or less, when determined by the above-described method. To improve the precision of the measurement, several samples selected from throughout the web should be examined and the results averaged.

Where the sheet covers a considerable area and must be prepared by traversing either the jet or receiver or both, a gross pattern may be present due to the traversing even though not apparent to visual inspection and even though the sheet will be random according to the above definition.

Depending on the particular polymers used and the mode of filament preparation, the individual filaments may exhibit a high level of crimp. The concept of filament crimp is understood in the art. In a filament crimp the amplitude of the departure from a straight line is less than 3 times the radius of curvature of the crimp, the latter being always less than 0.5 in. The presence of crimp in the filaments can contribute to the utility of the sheet. For example, finished structures based on sheets wherein the individual filaments exhibit crimp at levels in excess of about 30 crimps per inch are useful in apparel applications, owing to their enhanced softness and drapability. At crimp levels in excess of about 100 crimps per inch, the effect is especially pronounced. At crimp levels less than about 30 crimps per inch, the articles are stiffer, hence are best suited for the more demanding industrial applications, e.g., in tarpaulins.

Crimped filaments can be obtained during the operation of the process of this invention by orienting the filaments immediately subsequent to the preparation thereof. Representative of such a process is the one described in U.S. Patent No. 2,604,689 to Hebeler. Variations of this basic procedure are applicable to melt-spun filaments generally; the process is termed "spin-drawing." It is especially useful with filaments of poly(hexamethylene adipamide), polycaproamide, and poly(ethylene terephthalate), including copolymers thereof. In the case of most spun-drawn polyamides, the crimp develops spontaneously after a few minutes standing. The rate at which the crimp develops depends on such factors as realtive humidity, tension, and temperature, the crimping taking place most rapidly at elevated temperature in relatively humid atmospheres. In other words, the spontaneous crimping occurs most readily under conditions of relaxation. The product retains its crimp upon subsequent cooling, etc. Assuming reasonable uniformity of preparation (spinning, orienting, etc.), the individual filaments exhibit good uniformity of mechanical properties, crimp level, and the like, along their respective lengths. The mechanical properties of these filaments are superior to typical as-spun filaments prepared in a conventional manner, which exhibit tenacities generally less than one gram per denier at excessively high elongations. In the case of poly(ethylene terephthalate) or the like compositions, a distinct relaxation step is required, during which the filaments shrink, crimp develops and, in many instances, the property of spontaneous extensibility is achieved (see Kitson and Reese, U.S. Patent 2,952,879). Relaxation can be effected as a separate operation apart from sheet preparation, by heating the sheet, or during sheet formation proper by heating (steam, hot air, or infra-red radiation) the separated filaments within or downstream from the pneumatic jet. The filaments may be collected on a hot water bath to effect relaxation simultaneous with collection. In the case of filaments supplied in accordance with FIGURE 1b, the filaments may already be crimped and so long as such crimp does not impede filament separation, the method is a satisfactory one. Crimp can also be obtained in filaments by the process described in Kilian, U.S. Patent 3,118,012 or by the use of two-component fibers as disclosed in Breen, U.S. Patent 2,931,091. Crimp also is obtainable in filaments composed of thermoplastic polymers by the deformation thereof over a sharp surface such as a blade or edge over which the filaments make an acute angular pass. The "edge" may be heated to enhance further this effect; the method can be practiced by substituting a blade-like member for one or more of the bars 33, 34, or 35 in FIGURE 5 (to be described in greater detail). The development of crimp in such products also is enhanced by relaxing conditions. The presence of crimp in the filaments tends to cause filament entanglement and, therefore, may require more careful control. Crimp enhances the stability of the sheets and contributes to improved covering power.

Stationary guides may be used to control the position of the filament bundle prior to its entry into the pneumatic jet or to provide additional surfaces over which the filaments may be charged triboelectrically. If used for the latter purpose, the surface of the guides should be grounded. Often ceramic guide materials are useful since they resist yarn-induced abrasion. Refractory materials, e.g. chromium oxide, also are useful. As is true with all textile surfaces, abrasion resistance (wearability) is an important criterion. Delustered filaments, in particular, are quite abrasive. Chromium oxide has been found to afford a satisfactory combination of triboelectric efficacy and wearability. For any particular polymer, optimum processing depends on the selection of guide compositions. However, it is possible to enhance the operability of a given composition which is highly receptive to triboelectric charging into the body of a filament which is less receptive (see, for example, U.S. Patent 2,936,482, issued May 17, 1960, to Kilian).

The stability of the nonwoven structures prapared via the process of this invention can be enhanced, by the application of a suitable binder. It should be emphasized, however, that many of the structures prepared by the process of this invention inherently possess sufficient stability for many uses. These attributes have heretofore been impossible to achieve in an as-formed nonwoven structure especially one composed entirely of continuous filaments. The binder material may be applied during the preparation of the articles by spraying or atomizing the same onto the filaments after they have been charged. The binder is usually an adhesive, effective as applied or subsequently developed upon the application of heat. Alternatively, the as-formed web may be dipped into or printed with a dispersion or solution of binder, e.g., in a latex dispersion, so as to bond the individual filaments. A binder also may be introduced in the form of fibrids or low-melting fibers which, upon later application of heat or solvent, become adhesive. The binder fiber can be introduced by aspiration into the pneumatic jet along with the main body of filaments. Indeed, the binder fiber may be co-spun, i.e., from the same or an adjacent spinneret as shown in FIGURE 11. Preferred binder fibers for use with poly(hexamethylene adipamide) include polycaproamide filaments or copolymers, melt blends, etc., thereof with poly(hexamethylene adipamide). Preferred binder fibers for use with poly(ethylene terephthalate) include the isophthalate and hexahydroterephthalate copolymers thereof or merely poly(ethylene terephthalate) filaments of reduced orientation (see Piccard and Signaigo, U.S. Patent 2,836,576). Finally, the sheets may be rendered more coherent merely by pressing them as freshly prepared. This "self-binding" technique is surprisingly satisfactory and is sufficient to produce a structure useful for numerous applications as such. It is noted in the "self-binding" procedure that the low crystallinity and crimp in the component filaments are believed to be in part responsible for the efficacy of the over-all operation. The instant nonwoven structures may also be rendered more stable to delamination by the controlled application of heat, which serves to fuse individual filaments at points of filament crossings. Enhanced coherency also may be effected via a controlled spark discharge at intervals through the main body of filaments, or by needling techniques (see, for example, Lauterbach and Norton, U.S. Patent 2,908,064). Numerous other methods for enhancing the stability of the sheet-like structures of this invention may be employed, many of such techniques being available in the prior art. The purpose of any such techniques is, of course, to enhance the stability of the nonwoven sheet.

By the process of this invention, sheet-like structures can be prepared which are notably soft and drapable, exhibit impressive aesthetic properties including the ability to stimulate desirable tactile responses, and show high tensile and tear strengths, characteristic of the component fibers. It is to be noted that unlike woven fabrics the nonwoven sheets of the instant invention may, if desired, exhibit an azimuthal uniformity of tensile properties, i.e., these properties are isotropic. This unusual combination of attributes renders the structures of the present invention suitable for use without subsequent "bonding," in a wide variety of applications.

The following examples illustrate several embodiments of the invention.

The relative viscosities of the polyamides and polyesters used in the examples are determined with polymer solutions of the following concentrations:

Polyamides: 8.40% polymer by weight in 90% formic acid —10% water
Polyesters: 8.04% polymer by weight in fomal (10 parts phenol and 7 parts trichlorophenol)

The melt index of polyethylene and polypropylene is determined by ASTM method D–1238–57T at a temperature of 190° C. and load of 2.16 kilograms. The melt flow rate of polypropylene is determined by the same method except that a temperature of 230° C. is used.

*Example 1*

Using an apparatus assembly essentially as shown in FIGURE 1a, omitting idler roll 3, poly(hexamethylene adipamide) (39 relative viscosity) is spun through a 34-hole spinneret (each hole 0.009 inch in diameter) into filaments at a rate of 16 grams total polymer per minute, at a temperature of 290° C. The filaments are spun into a quiescent atmosphere at ambient temperature (25° C.) and relative humidity (70%). Downstream (ca. 30 inches) past the point of solidification and about 6 inches laterally from the normal filament line, a pneumatic jet (see FIGURE 3) of the following dimensions is placed:

Inlet diameters, 15/16 inch
Filament passageway diameter, 3/32 inch
Inlet cut-down to minimum diameter occurs over 3/4 inch
Filament passageway length, 15½ inches
Angle of air entry (below inlet), ca. 15 degrees The jet, which is grounded, has inlet section or throat 7 composed of aluminum; the body of the jet is composed of brass. The filaments make triboelectric contact with the throat of the jet. The receiver is a 12 in. x 12 in. aluminum plate which is manually manipulated (hence grounded). Filaments are collected into hand sheets by interposing the receiver into the filament line and rotating the same until a sheet of the desired thickness and configuration is obtained. The results of several such runs are summarized in Table I.

TABLE I

| Run | Air Pressure (P), p.s.i.g. | Filament | | |
|---|---|---|---|---|
| | | Denier | T/E [1] | Mi [2] |
| 1 | 5 | 6.0 | 1.9/408 | 6.0 |
| 2 | 15 | 1.9 | 2.8/201 | 6.7 |
| 3 | 25 | 1.6 | 3.6/190 | 9.0 |
| 4 | 35 | 1.5 | 3.5/172 | 9.5 |
| 5 | 45 | 1.7 | 3.6/142 | 8.8 |

[1] Tenacity (T), grams per denier/Elongation (E), percent.
[2] Mi=initial tensile modulus, g.p.d.

In all runs, process operability was very good, uniform sheets with good filament separation being produced. Similar sheets are obtained at good levels of operability when the polymer used in the above runs is polycaproamide.

*Example 2*

Sheets are prepared from poly(ethylene terephthalate) using the apparatus shown in FIGURE 5. Referring to that drawing, filaments 1 spun from spinneret 2 pass in the manner shown over the bar guides 33, 34, and 35, thence to pneumatic jet 5 supplied with air under pressure through inlet 6. Jet 5 embodies filament passageway extension 19 flared outwardly (6°) at the terminus 36. The charged filaments 9, which separate on exiting the extension of jet 5, are collected on receiver 11, an aluminum plate. The various components downstream from spinneret 2 are grounded through leads 12. The pertinent distances along the filament line are as follows:

| | Inches |
|---|---|
| a | 17 |
| b | 19 |
| c | 22½ |

| | Inches |
|---|---|
| d | 25½ |
| e (ca) | 4 |
| f | 48 |
| g | 7½ |
| h | 12 |

The filaments are quenched with air, applied 6 inches below the spinneret face. The guide bars 33, 34, and 35 are 1 in. x 1 in. with rounded edges and are composed of chromic oxide. Guide bar 34, i.e., the functional surface thereof, is offset from the filament line by 2½ inches. Pneumatic jet 5 is shown in greater detail in FIGURE 6, wherein the reference numerals have substantially the same significance as the ones in FIGURE 3. The important dimensions are:

Inlet diameter, ca. ¾ inch
Filament passageway diameter, 0.05 inch
Inlet angle, 60°
Angle of air entry, 5°
Air entry 1⅜ inches below filament inlet The entire jet assembly is fabricated from brass.

In operation, poly(ethylene tetrephthalate) (34 relative viscosity) is spun through a 30-hole spinneret at a rate of 10 grams (total) polymer per minute. Each spinneret hole is 0.007 inch in diameter. The spinning temperature, measured at the spinneret, is 287° C. The following results are obtained:

TABLE II

| Run | Air Pressure (P), p.s.i.g. | Filament Properties | | | |
|---|---|---|---|---|---|
| | | Tenacity, g.p.d. | Elong., percent | Mi, g.p.d. | Denier |
| 1 | 40 | 2.0 | 185 | 14.5 | 1.72 |
| 2 | 50 | 2.4 | 148 | 16.2 | 1.37 |
| 3 | 70 | 3.5 | 101 | 29.9 | 1.10 |
| 4 | 80 | 3.5 | 104 | 28.0 | 1.03 |
| 5 | 90 | 3.1 | 77 | 26.7 | 0.97 |

In all of the runs reported in Table II, process operability is good, as is sheet formation. The resulting sheets are substantially free for aggregated filaments, i.e., filament separation subsequent to charging is wholly satisfactory. Note that increasing air pressure results in a corresponding increase in the speed at which the filaments are delivered to the receiver; filament speeds increase from 1890 yards per minute in Run 1 to 3350 yards per minute in Run 5.

When each of the above runs is repeated except that atmospheric steam at about 150° C. is applied to the separated filaments downstream from the pneumatic jet using a foraminous member disposed annularly with respect to the filaments, the filaments relax upwards to 20% or more with concomitant development of crimp. Upon later calendering, the filaments in the sheet elongate spontaneously, thereby further contributing to the crimp level in the individual filaments and hence to the properties of the sheet.

When each of the above runs is repeated except that the filaments are collected in 75° C. water, the filaments again relax, leading to the development of crimp up to levels of 50 or more crimps per inch (based on in situ examination). The filaments spontaneously extend upon subsequent treatment at elevated temperatures. The filaments may be caused to relax by employing a heated gas in the pneumatic jet or in a relaxing chamber downstream from the jet.

*Example 3*

The apparatus of Example 2 is employed in the preparation of sheets composed of polypropylene filaments. The pertinent distances are the same except for the following (v. FIGURE 5):

| | Inches |
|---|---|
| a | 18 |
| b | 22 |
| c | 30 |
| d | 38 |

Guide bar 34 is offset from the filament line by 2 inches. Polypropylene (10 melt-index) is spun at a rate of 6 grams per minute through a 30-hole spinneret, each hole being 0.009 inch in diameter. The spinning temperature (at the spinneret) is 190° C. Uniform sheets are obtained. Using 19 p.s.i.g. air, the following properties are obtained in the individual filaments:

TABLE III

| | T | E | Mi | Denier |
|---|---|---|---|---|
| As-spun | 2.35 | 369 | 17.9 | 1.51 |
| Boiled off relaxed | 1.76 | 338 | 13.8 | 1.75 |

*Example 4*

The following example illustrates co-spinning of poly (hexamethylene adipamide) (39 relative viscosity) and a 10% (weight) polycaproamide copolymer (45 relative viscosity) thereof. The 66-nylon is spun from a 34-hole spinneret (0.009 inch hole diameter) at 16 grams total per minute at 290° C. The 66/6-nylon copolymer is spun from a 20-hole spinneret (0.009 inch hole) at 255° C. and the output from 2 holes (1.78 grams per minute) is combined with the 34 filaments of 66-nylon. The two spinnerets are located on 5½ inch centers. The freshly spun filaments are passed over a grounded, polished aluminum bar located 40 inches below, parallel to and offset by 6 inches from the centerline of the spinnerets. A pneumatic jet as shown in FIGURE 3 is located 1 inch below the point where the filaments contact the bar. Air at 25 p.s.i.g. is supplied to the jet. The receiver, a 42 in. x 42 in. grounded aluminum plate, is located 40 inches below the jet. The receiver is traversed at a speed of 280 inches per minute below the jet and is further traversed at a speed of 28 inches per minute in a direction perpendicular to the primary traverse. Collecting in this manner for about 8½ minutes yields a uniform sheet having a 4 ounce per square yard basis weight. The spinning speed during this run based on polymer through-put and final filament denier, is 2900 yards per minute. Typical properties of 66-nylon filaments prepared by this procedure are: $T/E=3.5$ g.p.d./165%; $Mi=7.5$ g.p.d.-denier per filament, 1.60.

During the process described, the filaments are charged triboelectrically as they pass the aluminum bar; they are oriented upstream of the pneumatic jet, partly at the bar and partly by melt attenuation upstream from the bar. By virtue of the co-spun "binder fiber", the resultant web can be rendered more stable by heating. For example, the web is pressed between 50-mesh stainless steel screens at 50 p.s.i. at 200° C. for 1 minute to yield a tough, drapable fabric which exhibits enhanced resistance to delamination. A typical fabric prepared by this method has a tensile strength of 10 lbs./in./oz./yd.$^2$.

Using an apparatus assembly similar to that described in Example 2, poly(ethylene terepthalate) can be spun through a 68-hole spinneret while a poly(ethylene isophthalate/terephthalate) copolymer (20/80) is co-spun through an adjacent 34-hole spinneret, incorporating at least two of the latter filaments in the resulting web. A uniform web is obtained which, by virtue of the co-spun "binder fiber," can be rendered more stable by subsequent heating. Taking into consideration the different compositions, the instant web will be comparable to the ones obtained hereinabove as regards uniformity of laydown, freedom from filament aggregates, and the like;

enhanced stability after heating, characteristic of sheets prepared by co-spinning, also is observed.

Example 5

This example illustrates multiple jet operations. Poly(hexamethylene adipamide) is spun from two 34-hole spinnerets as described in Example 4. Four FIGURE 3 pneumatic jets are aligned 48 inches below the spinnerets and offset by 6 inches from their center line. Half of the filaments from each spinneret are fed to each of two of the grounded jets. The filaments are collected on a grounded belt moving continuously across the array of filaments to form a uniform continuous filament nonwoven web.

Example 6

(A) Poly(hexamethylene adipamide) of 39 relative viscosity is melt spun from a 34-hole spinneret (0.009 inch hole diameter) at a rate of 16 total grams per minute, at a spinning temperature of 272° C., into ambient air at 20° C., 55% relative humidity. The air jet of FIGURE 3 is centered 45 inches below the spinneret, 30 inches above a grounded aluminum collecting plate. The filaments are charged triboelectrically by introducing a ½ inch diameter polished aluminum rod into contact with the bundle of filaments at a point four inches above the jet. The air jet and the charging rod are mounted on a common bracket, which is grounded through a standard resistance of 6 megohms. The leads from a vacuum tube voltmeter are connected across this resistance. From the known internal resistance of the voltmeter and the observed voltage drop across the standard resistance it is possible to calculate the current flow from the jet/rod assembly. This current is a direct measure of the number of electrons transferred triboelectrically between the aluminum rod and the filaments. The effect on the process operability, i.e., web formation, of varying current flow at several air pressures (at the jet) is set forth in Table IV. The current flow is increased by increasing the contact angle of the filaments on the aluminum rod.

TABLE IV

| Run | Operability, Sheet Character | Current Flow (microamperes), Air Pressure | | | Calculated Average Charge on Filaments (e.s.u./m.²), Air Pressure | | |
| --- | --- | --- | --- | --- | --- | --- | --- |
| | | 60 p.s.i.g. | 45 p.s.i.g. | 30 p.s.i.g. | 60 p.s.i.g. | 45 p.s.i.g. | 30 p.s.i.g. |
| 1 | No laydown, filaments blown off collector plate. | 0.2 | 0.2 | 0.2 | 10,000 | 10,000 | 10,000 |
| 2 | Filaments adhere to plate in bundles, aggregates. | 0.2–1.0 | 0.2–0.8 | 0.2–0.5 | 30,000 | 25,000 | 18,000 |
| 3 | Filaments adhere to plate, good separation of filaments between jet and plate, uniform random laydown producing uniform sheet structure. | 1.0–1.7 | 0.8–1.4 | 0.5–0.8 | 65,000 | 55,000 | 33,000 |
| 4 | Filaments adhere to both plate and jet, tangled filaments observed, non-uniform sheets produced. | 1.0 | 0.8 | 0.5 | 50,000 | 40,000 | 25,000 |

In the above table, the filament contact angle is progressively increased from Run 1 to Run 4. It is seen that the current increases through a maximum and then falls off. Operability is optimum during the range of current flow in Run 3. The data of Run 3 serve to define a preferred operating range such as shown diagrammatically in FIGURE 4. The data reported in Table IV are characteristic of the particular apparatus geometry, jet type, spinning conditions, and filament-guide compositions.

(B) Part A is repeated with the jet located 79 in. below the spinneret and 24 in. above the grounded collecting plate. Because the spinneret-jet distance is greater than in Part A, a higher range of air pressures (at the jet) is used. The current flowing from the rod/jet assembly to ground is measured directly with an ultrasensitive DC microammeter. The level of charge on the filaments at various air pressures and at various contact angles between the filaments and the aluminum rod is measured by collecting the filaments exiting from the jet in a calibrated Faraday pail coulometer and is expressed as esu per square meter of filament surface. The results are summarized in Table V.

The "Faraday pail" shown in FIGURE 17 consists of a metal vessel 69 with an opening 70 for entrance of the filaments and a fine screen bottom 71 for easy displacement of air. The vessel 69 is largely surrounded by a metal shield 72. The shield is electrically insulated from the vessel by polytetrafluoroethylene insulators 74. The vessel is connected by means of coaxial cable 75 with a grounded sheath to the high voltage terminal of an electrostatic voltmeter 76.

The voltmeter 76 is short circuited for an instant to remove any residual charge from the system, the pail is placed directly below the exit of the pneumatic jet 5 and a known mass of charged filaments 73 is collected in the vessel. The voltage read on the electrostatic voltameter 76 can be related to the net electrical charge $Q$ by the simple relation $Q=CV$, where $Q$ is the charge, $V$ is the measured voltage, and $C$ is the total system capacitance to ground (pail, cable, and voltmeter). This capacitance is usually measured experimentally rather than calculated.

TABLE V

| Run | Jet Pressure (p.s.i.g.) | Charge on Filaments exiting from jet (e.s.u./m.²) | Current Flow (microamperes) | Remarks |
| --- | --- | --- | --- | --- |
| 5 | 50 | <3,000 | 0.1 | No laydown; filaments blown off collector plate. |
| | 60 | 5,200 | 0.2 | |
| | 70 | 3,300 | 0.1 | |
| 6 | 50 | ------ | 0.7–0.9 | Filaments adhere to plate in bundles. |
| | 60 | 31,500 | 0.5–0.8 | |
| | 70 | 22,400 | 0.4–0.7 | |
| 7 | 50 | 76,600 | 1.2–1.7 | Good filament separation; good web laydown. |
| | 60 | 89,000 | 1.5–2.2 | |
| | 70 | 106,000 | 1.8–2.2 | |
| 8 | 50 | 21,000 | 0.4–0.7 | Entangled filaments; filaments adhere to jet. |
| | 60 | 63,400 | 0.8–1.0 | |
| | 70 | 61,500 | 0.9–1.1 | |

The contact angle between the filaments and the aluminum bar is progressively increased as described in Part A and again the current increases with increased snubbing but drops at the highest snubbing as found before. It is observed in Run 8 (highest snub) that a high charge was placed on the yarn, however, the jet air pressure is not high enough at this charge level to continuously forward the filaments from the exit of the jet and the filaments are periodically attracted back to the outside of the jet rather than being forwarded continuously to the laydown belt. When the yarn builds up sufficiently around the exit of the jet, it momentarily plugs the jet causing the yarn momentarily to have a drastically reduced spinning speed. This results in a sharp decrease of charge on the yarn; hence, the *average* current flow measured with the ultrasensitive DC microammeter appears to be lower than in Run 7. The products obtained in Run 7, in which the charge levels are well above 30,000 e.s.u./m.² of filament surface, have an excellent, nonblotchy appearance.

(C) Runs 5, 6, and 7 of Part B are repeated at a jet pressure of 70 p.s.i.g., except that the air jet is centered 94 in. below the spinneret and 35 in. above a web-laydown belt. The aluminum rod is located 6 in. above the jet. The filaments are collected as a random nonwoven web on the laydown belt, which moves at a speed of 12.5 in./min. and has a charged plate located beneath to hold the filaments to the belt. The web is consolidated by passing between a heated (75° C.) roll and an unheated roll under light pressure. Samples (8 in. x 8 in.) of the consolidated web are bonded individually by heating them in a laboratory press at 200° C., 5,000 lb. total pressure, for 30 seconds between two polytetrafluoroethylene-coated, grooved plates. The plates have 24 grooves per inch and are placed with the grooves at right angles to each other. The total pressure area between the land areas of the two plates is 4%. The formation values of the bonded sheets are determined. The results are summarized in Table VI.

TABLE VI

| Run | Same as Part B Run/p.s.i.g. | Charge on filaments exiting from jet (e.s.u./m.²) | Formation Value |
| --- | --- | --- | --- |
| 9 | 5/70 | <5,000 | <50 |
| 10 | 6/70 | 25,500 | 64 |
| 11 | 7/70 | 93,000 | 176 |

*Example 7*

Employing the apparatus assemblies from Examples 1 or 2 as indicated, uniform sheets are prepared from the various melt-spinnable polymers reported in Table VII according to the procedures in the indicated example.

TABLE VII

| Run | Polymer | Apparatus (Ex.) |
| --- | --- | --- |
| 1 | Linear polyethylene (melt index 0.36) | 2 |
| 2 | Plasticized polyacrylonitrile | 1 |
| 3 | Poly(meta-xylylene adipamide) | 1 |
| 4 | Poly(para-xylylene azeleamide) | 1 |
| 5 | Polyundecanoamide | 1 |
| 6 | Poly(hexahydro-para-xylylene terephthalate) | 2 |
| 7 | Poly(ethylene terephthalate)/poly(ethylene isophthalate) 90/10 copolymer | 2 |
| 8 | Polypyrrolidone | 1 |
| 9 | Polyoxymethylene | 1 |

*Example 8*

By repeating the procedure of Example 2 to produce a web of poly(ethylene terephthalate) filaments and then relaxing or shrinking the web in a step-wise (controlled) manner, that is, by partially shrinking, then embossing followed by further shrinking, there is produced a web in which the filaments each possess a microcrimp of some 400–500 crimps per inch superimposed upon the conventional crimp. The resulting web is very highly drapable.

*Example 9*

Polymer flake of poly(ethylene terephthalate) is melted in a melt grid at a maximum temperature of 295° C. and metered at a rate of 15 g.p.m. through a 1 in. layer sand filter bed and a 2 in. spinneret having 23 capillaries (0.009 in. diam. x 0.012 in. long). The pack block is held at 290° C. and the spinneret temperature is controlled at 285° C.

The bundle of fibers is quenched in the ambient air before entrance to draw jet, located about 70 in. below the spinneret. An operating pressure of 40 p.s.i.g. in the draw jet would provide a tension of about 3 grams on the bundle of filaments, as measured immediately above the jet. A negative corona is formed from a four point source 8 in. above the entrance to the draw jet, and about ¾ in. from the bundle of filaments. A rotating target bar (10 r.p.m. 1¼ in. diam.) makes a slight contact with the filaments and aids in maintaining a uniform distance between individual filaments and the corona source. A negative voltage of 30–40 kv. (200–250 μa.) is applied to the corona points.

The charged poly(ethylene terephthalate) filaments are deposited on a reciprocating table (30 in. square) charged to positive polarity (20 kv.). The speed of the table movement is adjusted to obtain the proper basis weight and satisfactory uniformity. With table speed conditions of 29 in./min. in one direction and 580 in./min. in the other direction, the charged filaments are deposited as a web at a rate of 0.8 oz./yd.² per minute. The filament properties are:

Denier _____d.p.f__ 2.3
Tenacity _____g.p.d__ 2.9
Elongation _____percent__ 183
Mi _____g.p.d__ 17.2

The bunching coefficient of the web is 0.80, and the visual uniformity is excellent.

*Example 10*

Polypropylene flake ("Profax") at an Mi of 10 is screw melted at a maximum temperature of 290° C. and metered at a 12 g./min. rate through a ¼ in. layer sand filter bed and a 2 in. spinneret having 20 capillaries (0.015 in. diam. x 0.020 in. long). The pack block is held at 275° C. and the spinneret temperature is controlled at 260° C.

The bundle of filaments is quenched radically in a 6 in. long quench chimney using 40 c.f.m. air at room temperature. The top of the quench chimney butts against the bottom of the spinning pack to minimize the effect of air flow on the spinneret temperature.

A draw jet operating at 25 p.s.i.g. provides a tension of about 3 grams on the bundle of filaments, measured immediately above the jet. Distance from spinneret to jet entry is 72 in. A negative corona is formed from a four point source at a distance of ⅝ in. from a 1¼ in. O.D. bar rotating at 10 r.p.m. The filaments make light contact with the target bar, the centerline of which is 8 in. above the entrance to the draw jet. A negative voltage of 20–25 kv. (100–150 μa.) is supplied to the corona points.

The charged filaments are deposited on a grounded 47 in. square table which reciprocates in two directions to form a web. Table motion is adjusted to obtain proper web weight and satisfactory web uniformity. Several layers are made for each sheet. For the conditions above, table speed is 26 in./min. in one direction and 570 in./min. in the other direction, and each layer is 0.5 oz./yd.².

Typical fiber properties are as follows:

Denier _____d.p.f__ 2.5
Tenacity _____g.p.d__ 2.0
Elongation _____percent__ 300
Mi _____g.p.d__ 14

The appearance of the web is uniform. The bunching coefficient of the web is 0.75.

*Example 11*

Using an apparatus assembly essentially as shown in FIGURE 8 and comprising a 34-hole spinneret, each hole 0.009 inch in diameter, poly(hexamethylene adipamide) (39 relative viscosity) is spun into filaments at a rate of 16 grams (all holes) polymer per minute, at a temperature of about 290° C. The filaments are spun into a quiescent atmosphere, at ambient temperature (25° C.) and relative humidity (70%). At the indicated distances downstream from the spinneret is located a copper jet, having the following dimensions (see FIGURE 9):

Yarn inlet 16 diameter (top) _____inches__ 1⅞
Filament passageway 8 diameter _____do____ ¾
Cut-down from yarn inlet to yarn passageway occurs over _____inches__ ½
Filament passageway 8 length _____do____ 27
Air inlet 6 diameter _____do____ ¾
Angle of airy entry 17 _____degrees__ 45

The pneumatic jet, which is supported in the filament line by insulated means, is connected to a source of electrostatic potential (rectifier generator Model No. H-40 available from New Jersey Engineering Company, Kenilworth, New Jersey). The receiver is a 12 in. x 12 in. solid aluminum plate, manipulated manually and grounded. Filaments are collected into hand sheets by interposing the receiver into the filament line and rotating the same until a uniform sheet of the desired thickness and configuration is obtained. The results of several such runs are summarized in Table VIII.

TABLE VIII

| Run | Distance (inches) | Air Pressure (p.s.i.g.) | Electrostatic Potential (volts) | Process Operability [1] | Sheet Character [2] |
|---|---|---|---|---|---|
| 1 | 8 | 50 | 20,000 | E | E |
| 2 | 6 | 50 | 20,000 | E | E |
| 3 | 6 | 50 | 4,000 | P | P |
| 4 | 4 | 50 | 9,000 | E | E |
| 5 | 6 | 30 | 14,000 | E | E |
| 6 | 6 | 20 | 7,000 | E | E |
| 7 | 4 | 20 | 2,000 | E | E |
| 8 | 4 | 40 | 16,000 | E | E |

[1] E—Excellent operability with no filament sticking or filament blowing; P—Poor operation of process including blowing of filaments, or filament sticking.
[2] E—Excellent uniformity of sheet structure including thickness, density, and stability; P—Poor uniformity of sheet structure.

The results in Table VIII indicate a region of optimum operability for preparing good uniform sheets similar to that illustrated in FIGURE 4. Essentially the same results are obtained when the jet charge is of the opposite polarity. Representative filaments taken from Run 1 have 3.76 g.p.d. tenacity at 141% elongation, 9.4 g.p.d. initial modulus, at least 60 crimps per inch, and 1.25 denier per filament. The filaments' speed beyond the jet in Run 1 is about 3,700 yards per minute.

*Example 12*

Example 11 is repeated, using a spinneret adapted to spin simultaneously two different polymers, one being poly(hexamethylene adipamide) homopolymer (40 relative viscosity), and the other a copolymer of polycaproamide (80%) and poly(hexamethylene adipamide) (20%) (41 relative viscosity). Each spinneret hole is 0.005 inch in diameter and there is a total of 50 holes. The pneumatic jet is supplied with 40 p.s.i.g. air and is located 8 inches from the spinneret face. The electrostatic charging potential at the jet is maintained at about 8,000 volts. The following results are obtained:

TABLE IX

| Run | No. of Filaments | | Spinning Rate, g./min. | | Web Characteristics |
|---|---|---|---|---|---|
| | Homopolymer | Copolymer | Copolymer | Homopolymer | |
| 1 | 40 | 10 | 7.5 | 30 | Excellent uniformity (20% 6/66). |
| 2 | 40 | 10 | 4.1 | 37.5 | Excellent uniformity (10% 6/66). |
| 3 | 40 | 5 | 1.5 | 22 | Excellent uniformity (6% 6/66). |

Stability of the web produced is enhanced by subsequently heating the web to a temperature in the vicinity of 200–220° C. Several advantages derive from co-spinning, including uniform binder distribution, good control of binder content, good web cohesion even prior to heating, and good resistance to delaminating and picking.

*Example 13*

Example 11 is repeated, using the following polymers:
(A) Poly(ethylene terephthalate) (specific resistivity $10^{10.7}$ ohm-cm. at 200° C.)
(B) Copolymer of poly(ethylene terephthalate) and 2% by weight 5-sulfoisophthalic acid (specific resistivity $10^{9.4}$ ohm-cm. at 200° C.)
(C) Polymer B containing 4½% by weight of the 5-sulfoisophthalic acid comonomer
(D) Polymer B containing 1% by weight of lithium chloride.

In practice, polymers B, C, and D perform in about the same manner and are marginally operable in this embodiment of this invention in which the filaments are charged prior to their complete solidification. Polymer A is inoperable, as evidenced by the absence of any useful effect upon charging the pneumatic jet—the extruded filaments do not lay-down on the receiver but blow about the room in an unmanageable fashion. The specific resistivity of poly(hexamethylene adipamide) (used in Example 11) at 200° C. is about $10^{7.4}$ ohm-cm.

*Example 14*

Using an apparatus assembly shown schematically in FIGURE 11, polypropylene flake having a melt index of 4.76 is screw melted at a temperature of about 250° C. and metered at a throughput rate of 18.0 g./min. through a sand filter bed to spinneret 2 having 30 holes (0.015 in. diameter x 0.075 in. long). The spinneret temperature is 223° C. and the spinneret block temperature is 240° C. After extrusion, the bundle of filaments is quenched radically in a 12-inch long quench chimney 37 supplied with air at 22° C. and a flow rate of 115 feet/minute.

From the quench chimney the filament bundle is led over guide roll 3 to heated feed roll 38 maintained at 118° C. and rotated to give a surface speed of 893 to 910 y.p.m. The draw ratio is thus 4.1–4.2.

The yarn is stripped from the draw roll and is forwarded by pneumatic jet 5 having a nozzle section shown schematically in FIGURE 12 and having the following dimensions:

|  | In. |
|---|---|
| Over-all jet length | 15¼ |
| Filament inlet diameter (16) | 0.062 |
| Filament inlet length (45) | 0.55 |
| Filament passageway (8), minimum diameter | 0.093 |
| Metering annulus (44): | |
|    Inner diameter | 0.0750 |
|    Outer diameter | 0.0930 |
|    Length | 0.020 |

The jet is supplied with air at 80 p.s.i.g. and applies a tension of about 36 grams on the filament bundle. The entrance to the jet is 110 inches from the draw roll.

Between the draw roll and the jet and 7½ inches from the latter, the filament bundle is exposed to corona discharge device 41 to impart an electrostatic charge to the fibers. The corona discharge device consists of a 4-point electrode positioned ⅝ inch from a grounded, 1¼ inch diameter, chrome-plated target bar rotating at 10 r.p.m. A negative voltage of 22–23 kv. (110–120 microamperes) is applied to the corona points. The filament bundle passes between the target bar and electrode and makes light contact with the target bar.

The jet is positioned at an angle of 80° with the plane of laydown belt 11 and is moved by traversing mechanism 42 so that it generates a portion of the surface of a cone, while the output from the jet forms an arc on the laydown belt having a chord length of 28¼ inches. The traverse speed of the jet is 24 passes (12 cycles) per minute. The distance from the exit of the jet to the laydown belt is approximately 26 inches. The laydown belt moves at a speed of 9 in./min. Plate 43 located beneath the belt is charged at +39 kv. to pin the filaments to the laydown belt. The filaments are laid down in the form of a random nonwoven sheet 10. Filament properties are: denier, 8 d.p.f.; tenacity, 4.1 g.p.d.

The sheet is self bonded by passing it at a speed of 10 y.p.m., while under restraint between a porous metal belt and a solid metal belt, for a distance of 37 inches through a steam chamber in which saturated steam is maintained at superatmospheric pressure. The steam on the porous belt side is maintained at 85 p.s.i.g. (corresponds to a saturated steam temperature of 164° C.) and on the solid belt side at 86 p.s.i.g. The difference in pressure serves to restrain the sheet and filaments against shrinkage during bonding.

The properties of the sheet after bonding are as follows:

| | |
|---|---|
| Basis weight (oz./yd.$^2$) | 4.3 |
| Strip tensile (lbs./in./oz./yd.$^2$) | 6.6 |
| Elongation (percent) | 7 |
| Tongue tear (lbs./oz./yd.$^2$) | 6.3 |

*Example 14A*

Example 14 is repeated with the following modifications:

(a) Surface speed of draw roll 40 --- 819–822 y.p.m.
(b) Draw ratio --- 3.8.
(c) Voltage applied to corona points --- −24 kv.
(d) Voltage applied to plate 43 --- +34 kv.
(e) Steam pressure in bonding operation
  On porous belt side --- 80 p.s.i.g. (corresponds to temperature of 162° C.).
  On solid belt side --- 82 p.s.i.g.

The charge level on the polypropylene filaments, determined by collecting filaments exiting from the jet device in a calibrated pail coulometer, is 74,100 e.s.u./m.$^2$ of filament surface. The filaments have a tenacity of 4.0 g.p.d. The properties of the sheet after bonding are as follows:

| | |
|---|---|
| Basis weight (oz./yd.$^2$) | 3.2 |
| Randomness, standard deviation, in. | $^1$ 0.4 |
| Strip tensile (lbs./in./oz./yd.$^2$) | 4.0 |
| Elongation (perecnt) | 4 |
| Tongue tear (lbs./oz./yd.$^2$) | 4.5 |
| Formation value | 145 |

$^1$ 2 samples.

*Example 15*

The apparatus assembly used in this example is shown schematically in FIGURE 11, wherein the filaments pass directly, as indicated by the dotted lines, from the spinnerets to the target bar of corona discharge device 41. Quench chimney 37 and guide roll 3 are not used in this apparatus embodiment. Poly(ethylene terephthalate) (27 relative viscosity) is spun through spinneret 2 having 17 holes (0.009 in. diameter x 0.012 in. long) at a total throughput of 18.3 g./min. while an 80/20 copolymer of poly(ethylene terephthalate)/poly(ethylene isophthalate) (29 relative viscosity) is spun through spinneret 2a having 20 holes (0.009 in. diameter x 0.012 in. long) at a total throughput of 13.0 g./min. The spinneret temperatures are 285° C. and 258° C., respectively. Four of the copolyester filaments are used and the other 16 are spun to waste. The filaments are quenched in the ambient air at 27° C. before entrance into a draw jet located about 65 inches below the spinnerets. The 21 filaments from the two spinnerets are combined into a filament bundle at the target bar of corona discharge device 41 which is located about 6 inches from the jet inlet.

The corona discharge device consists of a 4-point electrode positioned ⅝ inch from grounded, 1¼ inch diameter, chrome-plated target bar rotating at 10 r.p.m. A negative voltage of 35 kv. (200 microamperes) is applied to the corona points. The filament bundle passes between the target bar and electrode and makes light contact with the target bar.

The yarn is drawn and forwarded toward the laydown belt by a pneumatic jet 5 having a nozzle section as shown in FIGURE 12 and having the following dimensions:

| | In. |
|---|---|
| Over-all jet length | 24 |
| Filament inlet diameter (16) | 0.062 |
| Filament inlet length (45) | 0.55 |
| Filament passageway (8), minimum diameter | 0.093 |
| Metering annulus (44): | |
| Inner diameter | 0.0750 |
| Outer diameter | 0.0930 |
| Length | 0.020 |

Air at a pressure of 49.5 p.s.i.g. is supplied to the jet, which under these conditions applies about 13.5 grams total tension to the filament bundle. Attached to the bottom of the jet is a relaxing chamber (9½ in. long; ⅜ in. inside diameter) which is provided with an annular nozzle for supplying additional air to the relaxing chamber. In this example, hot air is not supplied to effect heat-relaxation of the filaments, but room temperature air is added at 4.5 s.c.f.m. to maintain nonturbulent flow in the relaxing chamber.

The jet-relaxing chamber unit is positioned at an angle of 82° with the plane of laydown belt 11 and is moved by traversing mechanism 42 so that it generates a portion of the surface of a cone, while the output from the relaxing chamber forms an arc on the laydown belt having a chord length of 36 inches. The traverse speed is 30 passes (15 cycles) per minute. The distance from the exit of the relaxing chamber to the laydown belt is approximately 30 inches. The laydown belt moves at a speed of 12.5 inches per minute. Plate 43 located beneath the belt is charged at +35 kv. to pin the filaments to the laydown belt. The properties of the homopolymer fibers are: denier 2.8 d.p.f.; tenacity 2.2 g.p.d.; percent shrinkage (when heated in water at 70° C. with no restraint), 36.3.

The random nonwoven web so prepared is consolidated by passing between a heated roll (75° C.) and an unheated roll under light pressure. Samples (8 in. x 8 in.) of the consolidated web are then bonded individually by heating them in a laboratory press at 215° C., 5,000 lbs. total pressure, for one minute between polytetrafluoroethylene-coated, 30 x 30 mesh screens. Randomness is determined with an optical randometer on 50 samples taken at random from the unbonded nonwoven web. The properties of the bonded nonwoven fabrics are as follows:

| | |
|---|---|
| Basis weight (oz./yd.$^2$) | 2.2 |
| Randomness, standard deviation, in. | 0.24±0.23 |
| Strip tensile (lbs./in./oz./yd.$^2$) | 11.0 |
| Elongation (percent) | 52 |
| Tongue tear (lb./oz./yd.$^2$) | 1.5 |

*Example 15A*

Example 15 is repeated with the following modifications:

(a) Throughput of poly(ethylene terephthalate) g./min. --- 18.4
(b) Spinneret temperatures:
  Spinneret 2 --- ° C. 271
  Spinneret 2a --- ° C. 263
(c) Voltage applied to corona points (160 microamperes) --- kv. −40
(d) Pressure of air supplied to the jet --- p.s.i.g. 51
(e) Room temperature air supplied to relaxing chamber --- s.c.f.m. 4.8
(f) Temperatures of consolidation of web --- ° C. 80

Individual samples of the consolidated web are bonded in a laboratory press at 220° C., 5000 lbs. total pressure, for 30 seconds between polytetrafluoroethylene-coated, grooved plates as described in Example 6C.

The charge level on the filaments exiting from the jet-relaxing chamber assembly is 57,300 e.s.u./m.$^2$ of filament surface. The properties of homopolymer filaments are: denier, 2.5; tenacity, 3.2 g.p.d.; percent shrinkage (when heated in water at 70° C. with no restraint), 35.9. The properties of the bonded sheet are as follows:

| | |
|---|---|
| Basis weight (oz./yd.$^2$) | 3.05 |
| Strip tensile (lbs./in./oz./yd.$^2$) | 12.9 |
| Elongation (percent) | 47 |
| Formation value | 200 |

Additional webs are prepared and bonded under the same conditions as above except that the voltage applied to the corona points is lowered stepwise from 45 kv. to 0 thereby varying the charge on the filaments.

Table X summarizes the charging conditions, levels of charge obtained and properties of the unbonded webs and bonded sheets.

TABLE X

| Sample | Electrostatic Charge | | Percent CV$_{fs}$ | F.V. | Tensile Strength, lb./in./oz./yd.$^2$ | Randomness Standard Deviation (in.) |
|---|---|---|---|---|---|---|
| | Voltage Applied (kv.) | Charge on Filaments (e.s.u./m.$^2$) | | | | |
| A | 45 | 76,200 | 74 | 200 | 13.8 | 0.5 |
| B | 40 | 57,300 | 84 | 160 | 12.2 | 0.4 |
| C | 35 | 45,000 | 93 | 160 | 12.1 | 0.2 |
| D | 30 | 33,900 | 102 | 120 | 12.1 | |
| E | 25 | 22,200 | 104 | 85 | 10.8 | |
| F | 20 | 12,900 | 106 | 82 | 9.1 | 0.5 |
| G | 15 | 1,700 | 121 | 65 | 7.1 | |
| H | 10 | | 118 | 67 | 5.0 | |
| I | 0 | | 115 | 70 | 5.5 | |
| J | 45 | 76,200 | 77 | 190 | 12.8 | 0.2 |
| K | 35 | 37,100 | 99 | 110 | 11.5 | 0.5 |

FIGURE 14 is a graph of the tensile strength and CV$_{fs}$ data in Table X. Since these data are for nonwoven webs having the same filament strengths, the data are highly significant and the graph shows clearly that there is a rapid drop in tensile strength at a CV$_{fs}$ above 100%. The data in Table X also indicate a significant and rapid deterioration of uniformity of appearance, as measured by formation value, at values of CV$_{fs}$ greater than 100%, the same critical level as that established by the tensile strength data. Wide fluctuations in uniformity and unsatisfactory product appearance are obtained with webs having a CV$_{fs}$ greater than 100%. In order to obtain sufficient separation of the filaments that nonwoven webs having a CV$_{fs}$ of less than about 100%, and a formation value greater than 100, are produced, the charge on the filaments exiting the jet must be above the level of 30,000 e.s.u./m.$^2$ of filament surface.

Data on randomness of the nonwoven webs are also included in Table X and indicate that the webs of this invention meet the previously defined limit for random webs.

*Example 15B*

The data in Example 15A are obtained on webs prepared with filaments which shrink 36% in 75° C. water. For comparison a series of webs is prepared with poly(ethylene terephthalate) filaments which spontaneously elongate 17% at 210° C. and co-spun binder filaments of an 80/20 copolymer of poly(ethylene terephthalate)/poly(ethylene isophthalate). The potential for spontaneous elongation is developed by supplying about 5 s.c.f.m. of hot air at a temperature of 500–600° C. to the relaxing chamber of a filament-forwarding jet device in Example 15. The walls of the relaxing chamber are cooled by water as described in Cope U.S. Patent 3,156,-752. The webs are bonded as in Example 15A. The results are summarized in Table XI.

TABLE XI

| Sample | Charge on Filaments (e.s.u./m.$^2$) | Percent CV$_{fs}$ | Tensile Strength, lb./in./oz./yd.$^2$ |
|---|---|---|---|
| L | 46,500 | 88 | 6.9 |
| M | 31,800 | 92 | 4.9 |
| N | 21,600 | 106 | 2.8 |
| O | 5,400 | 131 | 2.3 |

These data confirm the importance of having a high degree of uniform filament separation (CV$_{fs}$<100%) to obtain high strength levels with a given fiber tenacity, and also the necessity of having a charge level above 30,000 e.s.u./m.$^2$ to obtain this degree of filament separation.

*Example 16*

The apparatus assembly used in this example is as shown schematically in FIGURE 11A in combination with the jet-traversing mechanism and web-laydown system of FIGURE 11. Poly(ethylene terephthalate) filaments pass over feed rolls 38 rotated at a surface speed of 1500 y.p.m. and through the slot heater 39A maintained at 100° C. and then over draw rolls 40 which are rotated at a surface speed of 3000 y.p.m. The draw ratio is thus 2×. The poly(ethylene terephthalate) (27 relative viscosity) is spun through spinneret 2 having 34 holes (0.009 in. diameter x 0.012 in. long) at a throughput of 12.6 g./min. The spinneret temperature is 285° C. The filament bundle is stripped from the draw roll by means of jet 5. Between the draw roll 40 and jet 5 is a corona discharge device 41 which is located about 6 in. from the jet inlet.

The corona discharge device consists of a 4-point electrode positioned ⅝ in. from a grounded 1¼ in. diameter, chrome plated target bar rotating at 10 r.p.m. A negative voltage of from 48 kv. (310 microamperes) to 18 kv. (too low to read) is applied to the corona points and the filament bundle passes between the target bar and electrode and makes light contact with the target bar.

The filaments are forwarded toward the laydown belt by pneumatic jet 5 having a nozzle section as shown in FIGURE 12 and having the same dimensions as in Example 15. Air at a pressure of 30 p.s.i.g. is supplied to the jet, which under these conditions applies about 8 grams total tension (0.215 g.p.d.) to the filament bundle.

The jet 5 is positioned at an angle of 85° with the plane of laydown belt 11 and is moved by the traversing mechanism so that it generates a portion of the surface of a cone, while the output from the bottom of jet 5 forms an arc on the laydown belt having a chord length of 36 inches. The traverse speed is 30 passes (15 cycles) per minute. The distance from the exit of the jet to the laydown belt is approximately 29 inches. The laydown belt moves at a speed of 12.5 in./min. Plate 43 located beneath the belt is charged at +35 kv. to pin the filaments to the laydown belt. When a low charge is applied to the filaments (<20,000 e.s.u./m.²), it is necessary to apply air suction below the belt in order to pin the filaments. A 3 H.P. fan is used for the suction process. A suction duct is led to the side of a box (8 in. deep x 24 in. long x 36 in. wide) with an open slot located directly below the laydown screen. This suction slot is a semi-circular slot 4 in. wide and having a radius of curvature of 26¼ in. at the center of the slot. The properties of the fibers are: denier 2.1 d.p.f., and percent shrinkage (when heated in water at 75° C. with no restraint) 42.5%.

The random nonwoven webs so prepared are consolidated by passing between a heated roll (75° C.) and an unheated roll under light pressure. Samples (8 in. x 8 in.) of the consolidated web are bonded as described in Example 15A. Table XII summarizes the relationship between the charge on the yarn and the formation value of the sheet and indicates that a charge of at least 30,000 e.s.u./m.² is required to obtain a formation value above 100.

TABLE XII

| Run | Voltage Applied (kv.) | Charge on Filaments (e.s.u./m.²) | Formation Value | Randomness, Standard deviation (in.) |
|---|---|---|---|---|
| 1 | 48 | 68,400 | 177 | 0.2 |
| 2 | 43 | 48,000 | 145 | 0.3 |
| 3 | 38 | 34,200 | 115 | 0.2 |
| 4 | 33 | 28,200 | 90 | |
| 5 | 28 | 17,700 | 66 | |
| 6 | 23 | 8,100 | 53 | |
| 7 | 18 | ca. 1,500 | <50 | |

*Example 17*

The apparatus of Example 16 is employed in the preparation of sheets composed of polypropylene filaments. The pertinent conditions are the same except the surface of the feed roll 38 is rotated at 400 y.p.m. and the draw roll 40 at 900 y.p.m., giving a draw ratio of 2.25×, and the slot heater 39A is maintained at 120° C. The polypropylene (melt index of 4.76) is spun through a spinneret 2 having 30 holes (0.015 in. diameter x 0.75 in. long) at a throughput of 13.2 g.p.m. The spinneret temperature is 223° C. The filament bundle is stripped from the draw roll 40 and forwarded towards the laydown belt by a pneumatic jet 5 as described in Example 16. A negative voltage from 38 kv. (180 microamperes) to 11 kv. (current flow too low to read) is applied to the corona points of the corona discharge device.

The random nonwoven webs so prepared are bonded by heating with saturated steam as described in Example 14A. Table XIII summarizes the relationship between charge on the filaments and formation value. The results confirm the charge-formation value relationship shown in Example 16.

TABLE XIII

| Run | Voltage Applied (kv.) | Charge on Filaments (e.s.u./m.²) | Formation Value | Randomness, Standard deviation (in.) |
|---|---|---|---|---|
| 1 | 38 | 98,400 | 150 | 0.2 |
| 2 | 25 | 45,000 | 141 | [1] 0.3 |
| 3 | 23 | 25,800 | 95 | |
| 4 | 11 | <1,500 | 79 | |

[1] 3 samples.

*Example 18*

The apparatus assembly and procedure of Example 16 are used in this example to prepare webs composed of poly(hexamethylene adipamide) (nylon 66). Nylon 66 filaments pass over feed rolls 38 rotated at a surface speed of 1500 y.p.m. and through the slot heater 39A maintained at 110° C. and then over draw rolls 40 which are rotated at a surface speed of 3000 y.p.m. The draw ratio is thus 2×. The nylon 66 (39 relative viscosity) is spun through spinneret 2 having 34 holes (0.009 in. diameter x 0.012 in. long) at a throughput of 16.2 g./min. The spinneret temperature is 278° C. A negative voltage of from 43 kv. to 28 kv. is applied to the corona points of the corona discharge device. Air at a pressure of 40 p.s.i.g. is supplied to the pneumatic jet, which under these conditions applies about 18 grams total tension (0.31 g.p.d.) to the filament bundle.

The random nonwoven webs so prepared are consolidated by passing between a heated roll (95° C.) and an unheated roll under light pressure. Samples (8 in. x 8 in.) of the consolidated webs are bonded by heating them in a laboratory press at 200° C., 5,000 lbs. total pressure, for 30 seconds between polytetrafluoroethylene-coated grooved plates as described in Example 6C. Table XIV summarizes the relationship between the charge on the yarn and the formation value of the sheet.

TABLE XIV

| Run | Voltage Applied (kv.) | Charge on Filaments (e.s.u./m.²) | Formation Value | Randomness, Standard deviation (in.) |
|---|---|---|---|---|
| 1 | 43 | 52,000 | 176 | [1] 0.2 |
| 2 | 35 | | 91 | |
| 3 | 32 | 14,000 | 74 | |
| 4 | 28 | 7,000 | <50 | |

[1] 3 samples.

*Example 19*

Figure 15:
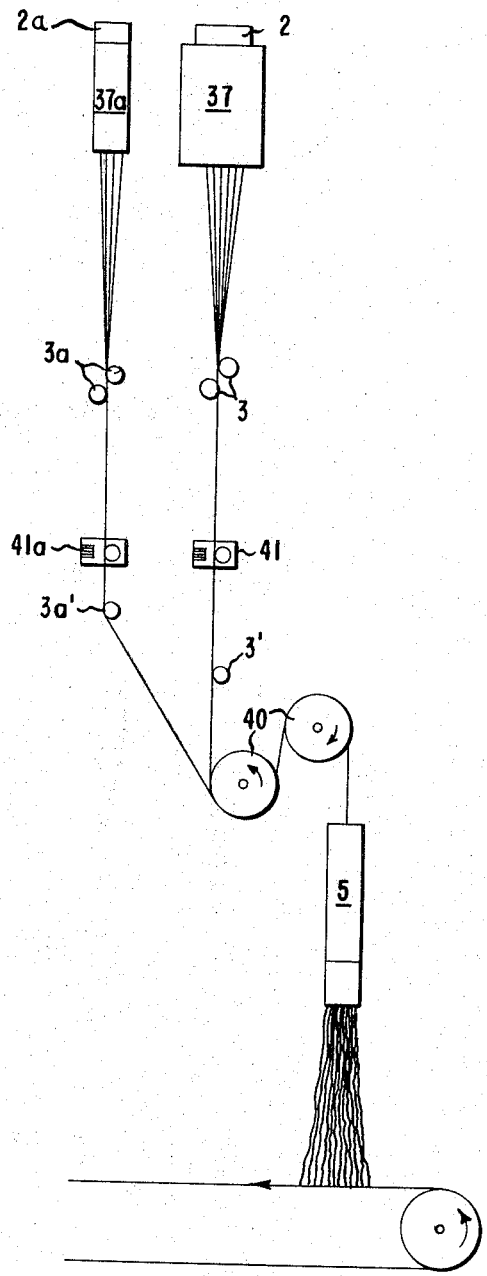
FIGURES 15 and 16 show additional apparatus assemblies suitable for use in the process of this invention.

Using an apparatus shown schematically in FIGURE 15, poly(ethylene terephthalate) (31 relative viscosity) is spun through spinneret 2 having 250 holes (0.009 in. diameter x 0.012 in. long) at a total throughput of 250 g./min., while an 80/20 copolymer of poly(ethylene terephthalate)/poly(ethylene isophthalate) (29 relative viscosity) is spun through spinneret 2a and having 72 holes (0.009 in. diameter x 0.012 in. long) at a total throughput of 30 g./min. The filaments are quenched by 110 c.f.m. of 70° F. air from the radial quench chimney, 37, for the homopolymer, and 25 c.f.m. of 70° F. air from the crossflow quench chimney, 37a, for the copolymer. The two spinnerets mounted in a joint block are at 291° C. The two filament bundles pass over guides 3 and 3a and are charged to a level of 54,000 e.s.u./m.² by the corona discharge devices 41 and 41a of the general type described in Example 15 with 17 corona points spaced in line on 0.25 in. centers. They pass over the further guides 3' and 3a' and converge on the draw rolls, 40, rotating at 3600 y.p.m. surface speed. The combined ribbon of filaments is stripped from the last draw roll by the high pressure pneumatic slot jet and diffuser 5. The width of the slot jet is 5 in. and that of the filament ribbon at this point is 4½ in. The copolymer filaments are uniformly dispersed across this ribbon by adjusting the convex surfaced guides 3a to give a copolymer ribbon of the same width as that of the homopolymer. The slot jet and diffuser are described in copending applications of Cope, Meagher and Zafiroglu, S.N. 425,839, filed January 15, 1965, and Franke, S.N. 431,691 filed February 10, 1965. The jet is supplied with 90 s.c.f.m. of air. The filaments are collected in the form of a web on a receiver 31½ in. below the diffuser and traveling at 27 ft./min. in a direction perpendicular to the slot of the jet. The sheet weighs 2 oz./yd.$^2$, has a formation value of 150 and may be bonded between a screen-covered, heated drum and a restraining wire screen to give a product similar to that of Example 15.

*Example 20*

Figure 16:
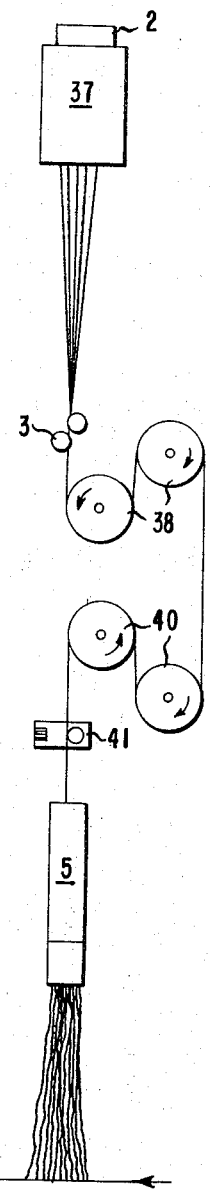

Using the apparatus shown schematically in FIGURE 16, polypropylene flake of 4.0 melt index is spun through spinneret 2 having 726 holes (.015 in. diameter by 0.090 in. long) at a total throughput of 455 g./min. The spinneret block temperature is 250° C. The filaments are quenched by 250 c.f.m. of 60° F. air from the radial quench chimney 37. The filament bundle passes over the guides 3 to the heated feed rolls 38 maintained at 105° C., and rotated at a surface speed of 248 y.p.m. The filament bundle then passes to the draw rolls, traveling at 930 y.p.m. The draw ratio is thus 3.75. The 5 in. wide bundle of filaments is stripped from the draw rolls by a 6 in. wide slot jet and diffuser 5, supplied with 110 s.c.f.m. The yarn is charged by a corona discharge device as in Example 19 to a level of 48,000 e.s.u./m.$^2$ before entering this jet. The jet and diffuser are of the type used in Example 19. The yarn is collected in the form of a web on a receiver 25 in. below the diffuser and traveling at 10 y.p.m. This sheet weighs 4.0 oz./yd.$^2$, has a formation value of 200 and may be bonded as in Example 14 to give a similar product.

*Example 21*

A nonwoven web of 14% low-oriented and 86% high-oriented crystalline polypropylene filaments is prepared as follows: isotactic polypropylene (melt flow rate MFR 12, by method of ASTM–1238 at 230° C. with a loading of 2.16 kg.) is spun from each of two spinnerets. One spinneret has 30 spinning orifices each 0.015 in. in diameter while the other has 5 orifices each 0.015 in. in diameter. The extrusion rate from the latter is 3 g./min. while polymer is extruded from the 30-hole spinneret at 18 g./min. The temperature of the 30-hole spinneret is 256° C. and that of the 5-hole spinneret, 221° C.

The filaments from the 30-hole spinneret are led to a heated feed roll operating with a surface temperature of 118° C., and advanced by means of an idler roll canted with respect to the heated roll. A total of 5 wraps is used on the heated feed roll, which is operated with a surface speed of 238 yd./min. From the heated roll the filaments are then passed 5 wraps around an idler roll/draw roll system operating cold with a surface speed of 842 yd./min. These filaments are drawn 3.54×, are 7.75 denier per filament and have a tenacity of 3.76 g.p.d.

The filaments issuing from the 5-hole spinneret are led to a heated roll operating with a surface temperature of 95° C. and a surface speed of 667 yd./min. After being in contact with the heated roll for 180°, the filaments leave the heated roll and are then passed to a draw roll operating cold with a surface speed of 858 yd./min. The filaments are in contact with the draw roll for 180° and are drawn 1.28×. As a result of this treatment the filaments are 7.8 denier per filament and have a tenacity of 1.55 g.p.d. The filaments from the two spinnerets meet and are guided so that the low-oriented filaments are dispersed uniformly throughout the high-oriented filaments.

The filaments are stripped from the draw rolls and forwarded by a pneumatic jet as described in Example 14. The jet is supplied with air at 80 p.s.i.g. and applies a tension of about 36 grams on the filament bundle. The entrance to the jet is 110 inches from the draw roll.

Between the draw roll and the jet and 7½ inches from the latter, the filament bundle is exposed to a corona discharge device to impart an electrostatic charge to the fibers. The corona discharge device consists of a 4-point electrode positioned ⅝ inch from a grounded, 1¼ inch diameter, chrome-plated target bar rotating at 10 r.p.m. A negative voltage of 23 kv. (90 microamperes) is applied to the corona points. The filament bundle passes between the target bar and electrode, makes light contact with the target bar and is charged to a value of 74,100 e.s.u./m.$^2$ of filament surface.

The jet is positioned at an angle of 90° with the plane of a moving web laydown belt and is moved back and forth across the web by a traversing mechanism. The traverse speed of the jet is 24 passes (12 cycles) per minute. The distance from the exit of the jet to the laydown belt is approximately 26 inches. The laydown belt moves at a speed of 9 in./min. A plate located beneath the belt is charged at +30 kv. to pin the filaments to the laydown belt. The filaments are laid down in the form of a random nonwoven web that is 30 inches wide.

The web is bonded by passing at a speed of 10 y.p.m. while under restraint between a porous metal belt and a solid metal belt, for a distance of 37 inches through a steam chamber in which saturated steam is maintained at superatmospheric pressure. The steam on the porous belt side is maintained at 74 p.s.i.a. (corresponds to a saturated steam temperature of 153° C.) and on the solid belt side, at 76 p.s.i.a. The difference in pressure serves to restrain the sheet and filaments against shrinkage during bonding.

The properties of the sheet after bonding are as follows:

Basis weight (oz./yd.$^2$) _____ 4.4
Strip tensile (lbs./in./oz./yd.$^2$) _____ 4.6
Elongation (percent) _____ 12
Tongue tear (lbs./oz./yd.$^2$) _____ 5.8
Formation value _____ 187
Randomness, Standard deviation (in.) _____ [1] 0.4
CV$_{fs}$ (percent) _____ 9
[1] 2 samples.

Table XI summarizes the formation values and CV$_{fs}$ of a series of sheets prepared as above, except that the belt speed and speed of the jet traverse are increased in order to obtain products having lower basis weights.

TABLE XV

| Basis Weight | Percent CV$_{fs}$ | Formation Value | Randomness, Standard deviation (in.) |
|---|---|---|---|
| 4.4 | 92 | 187 | [1] 0.4 |
| 3.3 | 93 | 165 | [2] 0.6 |
| 2.2 | 99 | 168 | [2] 0.4 |
| 1.1 | 93 | 175 | [3] 0.6 |

[1] 2 samples.
[2] 3 samples.
[3] 4 samples.

*Example 22*

Additional webs are produced according to the procedures of Examples 15A, 16, 17 and 18 in order to exemplify further the effect of charge level and of secondary variables, such as jet air velocity, number of filaments, distance from jet to web-laydown belt, and jet size on formation value. The results obtained in a number of such tests are summarized in Table XVI.

TABLE XVI

| Web Code No. | Prepared by Procedure of Example | Polymer [1] | Roll Speed Feed Roll/ Draw Roll, y.p.m. | Air to Jet, p.s.i.g.[2] | Air Velocity in Jet, ft./ min.[2] | Filaments No. | Filaments D.p.f. | Jet to Belt Distance (in.) | Charge, e.s.u./m.[2] | Formation Value |
|---|---|---|---|---|---|---|---|---|---|---|
| 1 | 15A | 2GT | | 69 | | 55 | 1.5 | 29 | 42,600 | 143 |
| 2 | 15A | 2GT | | 69 | | 55 | 1.5 | 29 | 21,300 | 60 |
| 3 | 16 | 2GT | 400/1,000 | 20 | $1.8 \times 10^3$ | 110 | 7.7 | 29 | 22,200 | 78 |
| 4 | 16 | 2GT | 400/1,000 | 130 | $8.25 \times 10^3$ | 110 | 7.7 | 29 | 15,900 | 68 |
| 5 | 16 | 2GT | 400/1,000 | 20 | $1.8 \times 10^3$ | 55 | 7.7 | 29 | 36,300 | 113 |
| 6 | 16 | 2GT | 400/1,000 | 70 | $4.81 \times 10^3$ | 55 | 7.7 | 29 | 46,500 | 114 |
| 7 | 16 | 2GT | 400/1,000 | 20 | $1.8 \times 10^3$ | 23 | 7.7 | 29 | 43,500 | 127 |
| 8 | 16 | 2GT | 400/1,000 | 70 | $4.81 \times 10^3$ | 23 | 7.7 | 29 | 67,800 | 131 |
| 9 | 16 | 2GT | 400/1,000 | 120 | $7.58 \times 10^3$ | 23 | 7.7 | 29 | 67,800 | 116 |
| 10 | 16 | 2GT | 1,200/3,000 | 30 | | 55 | 2.9 | 29 | 38,400 | 121 |
| 11 | 16 | 2GT | 1,200/3,000 | 70 | $4.81 \times 10^3$ | 55 | 2.9 | 29 | 52,200 | 130 |
| 12 | 16 | 2GT | 1,200/3,000 | 30 | | 55 | 2.9 | 29 | 26,100 | 82 |
| 13 | 16 | 2GT | 1,200/3,000 | 50 | | 23 | 2.9 | 29 | 9,900 | 52 |
| 14 | 16 | 2GT | 1,400/2,500 | 85 | $5.5 \times 10^3$ | 110 | 1.5 | 29 | 24,100 | 93 |
| 15 | 16 | 2GT | 1,400/2,500 | 105 | | 110 | 1.5 | 29 | 21,000 | 84 |
| 16 | 16 | 2GT | 1,400/2,500 | 125 | | 110 | 1.5 | 29 | 21,900 | 80 |
| 17 | 16 | 2GT | 1,400/2,500 | 145 | | 110 | 1.5 | 29 | 26,400 | 92 |
| 18 | 16 | 2GT | 1,500/3,000 | 40 | $3.18 \times 10^3$ | 34 | 2.1 | 35 | 35,100 | 113 |
| 19 | 16 | 2GT | 1,500/3,000 | 40 | $3.18 \times 10^3$ | 34 | 2.1 | 35 | 26,100 | 90 |
| 20 | 16 | 2GT | 1,500/3,000 | 40 | $3.18 \times 10^3$ | 34 | 2.1 | 35 | 17,100 | 77 |
| 21 | 16 | 2GT | 1,500/3,000 | 50 | | 55 | 2.8 | 18 | 51,300 | 135 |
| 22 | 16 | 2GT | 1,500/3,000 | 80 | $5.27 \times 10^3$ | 55 | 2.8 | 18 | 44,100 | 133 |
| 23 | 16 | 2GT | 1,500/3,000 | 50 | | 55 | 2.8 | 18 | 22,200 | 70 |
| 24 | 16 | 2GT | 1,500/3,000 | 40 | $3.18 \times 10^3$ | 110 | 2.8 | 29 | 3,000 | <50 |
| 25 | 16 | 2GT | 4,000 | 60 | $1.12 \times 10^4$ | 110 | 1.8 | 29 | 45,100 | 99 |
| 26 | 16 | 2GT | 4,000 | 50 | $8.28 \times 10^3$ | 110 | 1.8 | 29 | 37,200 | 103 |
| 27 | 16 | 2GT | 4,000 | 50 | $8.28 \times 10^3$ | 110 | 1.8 | 29 | 28,500 | 80 |
| 28 | 16 | 2GT | 4,000 | 100 | $2.69 \times 10^4$ | 110 | 1.8 | 29 | 21,000 | 54 |
| 29 | 16 | 2GT | 4,000 | 50 | $8.28 \times 10^3$ | 110 | 1.8 | 29 | 46,800 | 102 |
| 30 | 16 | 2GT | 4,000 | 80 | | 110 | 1.8 | 29 | 46,800 | 107 |
| 31 | 16 | 2GT | 4,000 | 40 | | 110 | 1.8 | 29 | 40,200 | 115 |
| 32 | 17 | PP | 400/900 | 80 | $5.27 \times 10^3$ | 30 | 6.1 | 29 | 98,400 | 150 |
| 33 | 17 | PP | 400/900 | 80 | $5.27 \times 10^3$ | 30 | 6.1 | 29 | 45,000 | 141 |
| 34 | 17 | PP | 400/900 | 140 | | 30 | 6.1 | 29 | 65,400 | 128 |
| 35 | 17 | PP | 400/900 | 140 | | 30 | 6.1 | 29 | 25,800 | 95 |
| 36 | 17 | PP | 400/900 | 40 | $3.18 \times 10^3$ | 30 | 3.4 | 29 | 87,600 | 154 |
| 37 | 17 | PP | 400/900 | 120 | $7.58 \times 10^3$ | 30 | 3.4 | 29 | 42,900 | 90 |
| 38 | 17 | PP | 400/900 | 120 | $7.58 \times 10^3$ | 30 | 3.4 | 29 | 16,800 | 63 |
| 39 | 17 | PP | 400/900 | 80 | $5.27 \times 10^3$ | 30 | 8.3 | 29 | 66,300 | 124 |
| 40 | 18 | N-66 | 1,500/3,000 | 55 | $3.93 \times 10^3$ | 34 | 1.2 | 29 | 12,300 | 84 |
| 41 | 18 | N-66 | 1,500/3,000 | 40 | $3.18 \times 10^3$ | 34 | 1.7 | 29 | 52,400 | 150 |
| 42 | 18 | N-66 | 1,500/3,000 | 85 | $5.5 \times 10^3$ | 34 | 1.2 | 29 | 66,000 | 150 |
| 43 | 18 | N-66 | 1,500/3,000 | 85 | $5.5 \times 10^3$ | 34 | 1.2 | 29 | 19,000 | 93 |
| 44 | 18 | N-66 | 1,500/3,000 | 85 | $5.5 \times 10^3$ | 34 | 1.2 | 29 | 4,500 | 66 |
| 45 | 18 | N-66 | 1,500/3,000 | 70 | $4.81 \times 10^3$ | 34 | 1.1 | 29 | 10,000 | 84 |

[1] 2GT=Poly(ethylene terephthalate); PP=Isotactic polypropylene; N-66=Poly(hexamethylene adipamide).
[2] For all webs except Nos. 25–31, the jet has a nozzle section of the design and dimensions of Figure 12 and Example 14. A jet of the same design but having a cross-sectional area 5 times larger is used in the preparation of webs 25–31.

*Example 23*

The suitability of nonwoven sheet samples A through K in Example 15A for use in window-shade cloth is determined by making pinhole counts. These counts are made on 3 1-in. square samples of each sheet. The sheets, which have constant filament cross-section and denier, are chosen to have basis weights of $4.5 \pm 0.25$ oz./yd.$^2$. An image of the 1-in. square sample is projected onto a screen at a linear magnification of 7 with a 35 mm. projector. The total number of pinholes (bright spots of light) is then counted. An alternative procedure is to project an image of a 1-in. square of sample onto photographic paper through an enlarger ($7 \times$) to obtain a permanent record of the sample. Pinholes lead to blackening of the paper and are counted directly using a Zeiss particle size counter. The data obtained are summarized in Table XVII.

TABLE XVII

| Sample | Percent $CV_{fs}$ | Pinholes |
|---|---|---|
| A | 74 | 530 |
| B | 84 | 460 |
| C | 93 | 530 |
| D | 102 | 1,080 |
| E | 104 | 1,720 |
| F | 106 | 1,780 |
| H | 118 | 2,580 |
| I | 115 | 2,280 |
| J | 77 | 390 |
| K | 99 | 200 |

Below a $CV_{fs}$ of about 100%, the number of pinholes is relatively small and the sheets are useful as shade-cloth materials. Above a $CV_{fs}$ of 100%, the number of pinholes increases three to five-fold and no reasonable amount of masking with opaque coatings will produce a useful shade cloth.

*Example 24*

The abrasion resistance of bonded nonwoven sheets from Example 15A is determined using the C.S.I.A. abrader. The conditions of this test are as follows: 1 in. x 2 in. sample size; abradant, 0; load, 5 lb./in.; 2 cycles/ minute. The results are summarized in Table XVIII.

TABLE XVIII

| Sample | Percent $CV_{fs}$ | Cycles to Failure* | Minimum Cycles to Failure |
|---|---|---|---|
| A | 74 | 1,160 | 557 |
| C | 93 | 940 | 427 |
| D | 102 | 545 | 243 |
| F | 106 | 270 | 57 |
| G | 121 | 340 | 37 |

*Average of 8 samples.

The data indicate the poorer abrasion resistance of the nonuniform sheets. The data on minimum cycles to failure are included to point out that certain areas of the nonuniform sheets fail quickly and result in failure for the entire fabric.

*Example 25*

Nonwoven sheets having a basis weight of 1.6 oz./yd.$^2$ are prepared by the general procedure described in Example 15B, except that the bonding operation is carried out between screens rather than grooved plates. One of the sheets (A) has a formation value of 110, and the other (B), 68. Collars for women's blouses are fabricated using the sheets as interlinings and a woven polyester/ cotton blend as the shell fabric. The collars made with sheet A are acceptable, but the collars made with sheet B are unacceptable because of excessive wrinkling at the seams caused by variations in basis weight (blotchiness) of the interlining.

While the process of this invention has been illustrated with reference to the collection of the filaments onto a planar grounded receiver, the charged filaments may also be collected on other forms of receivers. An important embodiment is that wherein the charged filaments are directed into the nip of a pair of grounded rolls. This operation tends to enhance the filament dispersal in the thickness dimension of the web, giving rise to enhanced stability in that dimension. After collection in this manner, the web is conveniently forwarded to subsequent operations, such as bonding and surfacing, by the action of the rolls.

The sheet-like structure prepared in accordance with the invention may serve a variety of useful purposes. With suitable coating and/or laminations, they may serve in industrial applications, in the stead of conventional woven materials. By incorporation of a suitable binder, with or without an additional embossing operation, cloth-like articles are produced. The nonwoven structures of this invention can serve in the preparation of felts, leather-like materials, and suede-like materials. With high binder content and high pressure calendering, paper-like articles are produced. The present structures can serve as interlining or interfacing materials useful in imparting shape and/or stiffness to garments. All of the above-mentioned articles which are based on the structures of this invention are strong in resistance to tear, have good tensile properties especially in the lateral dimensions, and some are significantly soft and drapable. The sheet-like structures function well in such important finishing operations as buffing, felting, shearing, brushing, needling, printing, embossing, napping, sanding and the like.

The practice of the process of this invention is advantageous in several respects. In the first place, it permits the rapid and continuous preparation of useful filaments. It also results in quite high rates of production of such filaments and the sheets prepared therefrom. The filaments are readily and continuously collected into useful structures assuming a wide variety of form, among which are sheet-like products extremely useful either as such or as converted by conventional techniques in the numerous applications to which nonwoven structures in general are commonly employed. This process makes possible for the first time the production of uniform sheet-like structures from substantially continuous synthetic filaments in a rapid and continuous operation. Optimum covering power is achieved in these sheets. Owing to their continuous-filament construction, such nonwoven structures exhibit excellent mechanical properties in all lateral dimensions, due to the isotropic nature of the structures. Numerous other advantages inherent in the practice of this invention will readily occur to those undertaking its practice.

What is claimed is:

1. A process for preparing a uniform nonwoven web of randomly disposed, continuous filaments, comprising forwarding a multifilament strand of continuous synthetic organic filaments while applying tension to the filaments, said filaments being capable of holding an electrostatic charge, developing an electrostatic charge on the filaments of the strand while the applied tension prevents the filaments from separating due to the imparted charge, directing the strand toward a laydown zone, releasing the tension from the filaments to permit them to separate from each other, collecting the separated filaments in the form of a random nonwoven web on a receiver in the laydown zone and moving the freshly deposited web away from the laydown zone at a rate such that the ratio of filament forwarding speed to the speed of the receiver is at least 5:1.

2. The process of claim 1 in which the multifilament strand comprises polypropylene filaments.

3. The process of claim 1 in which the multifilament strand comprises poly(ethylene terephathalate) filaments.

4. The process of claim 1 in which the multifilament strand comprises poly(hexamethylene adipamide).

5. A process for preparing a uniform nonwoven web of randomly disposed, continuous filaments comprising forwarding a multifilament strand of at least 20 continuous synthetic organic filaments while applying tension to the filaments, said filaments being capable of holding an electrostatic charge, developing by means of a corona discharge, an electrostatic charge of at least 30,000 c.g.s. electrostatic units per square meter of filament surface in the strand while the applied tension prevents the filaments from separating due to the imparted charge, directing the strand at a receiver, releasing said tension from the filaments to permit them to separate from each other and collecting the filaments while separated in the form of a random nonwoven web.

6. A process for preparing a uniform nonwoven web of randomly disposed, continuous filaments comprising forwarding a multifilament strand of at least 20 continuous synthetic organic filaments while applying tension to the filaments, said filaments being capable of holding an electrostatic charge, developing in the strand an electrostatic charge of at least 30,000 c.g.s. electrostatic units per square meter of filament surface while the applied tension prevents the filaments from separating due to the imparted charge, directing the strand toward a receiver in a laydown zone, releasing said tension from the filaments to permit them to separate from each other and collecting the separated filaments in the form of a random nonwoven web.

7. The process of claim 6 wherein the receiver removes the freshly deposited web away from the laydown zone at a rate such that the ratio of filament forwarding speed to the speed of the receiver is at least 5:1.

8. The process of claim 6 wherein the strand is forwarded by means of a pneumatic jet.

9. The process of claim 6 in which the filaments are poly(hexamethylene adipamide).

10. The process of claim 6 in which the filaments are poly(ethylene terephthalate).

11. The process of claim 6 in which the filaments are polypropylene.

12. The process of claim 6 in which the strand contains filaments of at least two different compositions spun simultaneously.

13. A process for preparing a uniform nonwoven web of randomly disposed, continuous filaments comprising forwarding a multifilament strand of continuous synthetic organic filaments while applying tension to the filaments, said filaments being capable of holding a triboelectric charge, passing the strand in rubbing contact with a solid surface to impart to the filaments sufficient triboelectric charge to separate each filament in the charged portion of the stand from adjacent filaments upon release of the tension, directing the strand toward a laydown zone by means of a pneumatic jet, releasing the tension in the strand to permit the filaments to separate from each other and collecting the separated filaments as a random nonwoven sheet upon a receiver in said laydown zone, the receiver moving the freshly deposited web away from the laydown zone at a rate such that the ratio of filament forwarding speed to the speed of the receiver is at least 5:1.

14. A process which comprises extruding a multifilament strand of at least 20 continuous filaments from a molten fiber-forming synthetic organic polymer having a specific resistivity at a temperature above the solidification temperature of less than $10^{10}$ ohm-cm., attenuating the extruded incipient filaments and cooling them sufficiently to remove any tackiness but avoiding complete solidification thereof, developing an electrostatic charge of at least 30,000 c.g.s. immediately prior to complete solidification of the filaments to cause their separation owing to forces of electrostatic repulsion and then collecting the filaments in the form of a nonwoven structure.

15. The process of claim 14 in which the filaments are collected on a receiver having sufficient electrical attraction to hold the charged filaments on the receiver.

16. The process of claim 15 in which the filaments comprise poly(hexamethylene adipamide).

17. The process of claim 15 in which the filaments comprise a mixture of synthetic organic filaments.

18. A process which comprises melting a fiber-forming synthetic, organic polymer which exhibits a specific resistivity less than $10^{10}$ ohm-cm. at a temperature above the solidfication temperature, extruding the polymeric melt in the form of continuous filaments, forwarding and thereby orienting the freshly formed filaments with a pneumatic jet as the filaments become nontacky but prior to the complete solidification thereof, electrostatically charging the incompletely solidified filaments while under restraint to prevent their separation owing to forces of electrostatic repulsion, directing the oriented and charged filaments toward a laydown zone and depositing them in the form of a nonwoven web onto a receiver having a substantially different charge, the receiver moving the freshly deposited web away from the laydown zone at a rate such that the ratio of filament forwarding speed to the speed of the receiver is at least 5:1.

19. A process for preparing a uniform nonwoven web of randomly disposed, continuous filaments, comprising forwarding a multifilament strand of continuous synthetic organic filaments while applying tension to the filaments, said filaments being capable of holding an electrostatic charge, developing an electrostatic charge on the strand while the applied tension prevents the filaments from separating due to the imparted charge, directing the strand toward a laydown zone, releasing said tension from the filaments to permit them to separate from each other and collecting the filaments while thus separated in the form of a random nonwoven web upon a receiver in said laydown zone, the receiver moving the freshly deposited web away from the laydown zone at a slower rate than the speed at which the filaments are forwarded to the laydown zone.

20. A continuous process for preparing a uniform, nonwoven web of randomly disposed, oriented, continuous filaments comprising extruding a multifilament strand of at least 20 synthetic organic filaments capable of holding an electrosatic charge, orienting said filaments, forwarding the strand while applying tension thereto, exposing the strand to a corona discharge to develop therein at least 30,000 c.g.s. electrostatic units per square meter of filament surface while the applied tension prevents the filaments of the strand from separating due to the imparted charge, passing the strand into a pneumatic jet to maintain tension on the strand, directing the strand exiting the jet at a receiver while releasing said tension from the filaments to permit them to separate from each other, and collecting the separated filaments in the form of a random nonwoven web.

References Cited

UNITED STATES PATENTS

| | | | |
|---|---|---|---|
| 2,336,745 | 12/1943 | Manning | 264—10 |
| 2,411,660 | 11/1946 | Manning | 264—24 |
| 2,998,051 | 8/1961 | Sittel | 264—24 |
| 3,156,752 | 11/1964 | Cape | 264—24 |

FOREIGN PATENTS

| | | |
|---|---|---|
| 932,482 | 7/1963 | Great Britain. |
| 1,306,205 | 9/1962 | France. |

DONALD J. ARNOLD, *Primary Examiner.*